United States Patent

Miyashita et al.

[11] Patent Number: 5,949,747
[45] Date of Patent: Sep. 7, 1999

[54] TEST RECORDING METHOD AND OPTICAL INFORMATION RECORDING/ REPRODUCING APPARATUS FOR DETERMINING AN OPTIMUM POWER OF THE LIGHT OUTPUT FROM A LIGHT SOURCE IN ERASING PIECES OF INFORMATION RECORDED ON A LAND AND GROOVE OF A RECORDING MEDIUM

[75] Inventors: Akira Miyashita, Tokorozawa; Takaaki Ashinuma, Yokohama, both of Japan

[73] Assignee: Canon Kabushiki Kaisha, Tokyo, Japan

[21] Appl. No.: 08/868,070

[22] Filed: Jun. 3, 1997

[30] Foreign Application Priority Data

| Jun. 4, 1996 | [JP] | Japan | 8-141509 |
| May 28, 1997 | [JP] | Japan | 9-138585 |

[51] Int. Cl.$^6$ .................................................. G11B 7/00
[52] U.S. Cl. ............................................................ 369/54
[58] Field of Search ............................. 369/54, 13, 116, 369/100, 121, 59

[56] References Cited

U.S. PATENT DOCUMENTS

| 4,918,677 | 4/1990 | Ashinuma et al. . |
| 5,706,259 | 1/1998 | Fukamachi et al. ............. 369/13 |

FOREIGN PATENT DOCUMENTS

| 63-57859 | 4/1988 | Japan . |
| 2-177027 | 7/1990 | Japan . |
| 5-282805 | 10/1993 | Japan . |
| 7-220280 | 8/1995 | Japan . |

Primary Examiner—Thang V. Tran
Attorney, Agent, or Firm—Fitzpatrick, Cella, Harper & Scinto

[57] ABSTRACT

A test recording method is provided to determine an optimum power of a light output from a light source in erasing pieces of information recorded on a land and a groove of a recording medium. A predetermined signal is recorded on a predetermined track of the medium. Data on a track adjacent to the track where the signal is recorded is erased with different erasing powers. The signal recorded on the track is reproduced to detect a reproduction signal. An optimum erasing power is set on the basis of the reproduction signal and the different erasing powers.

2 Claims, 18 Drawing Sheets

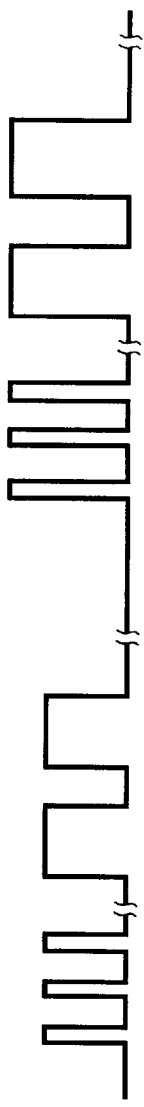
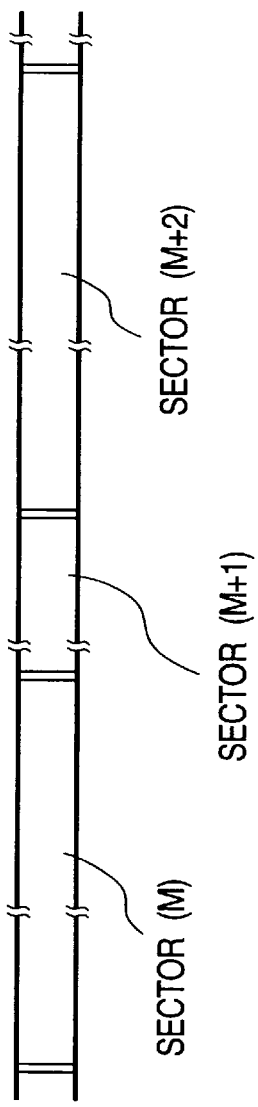
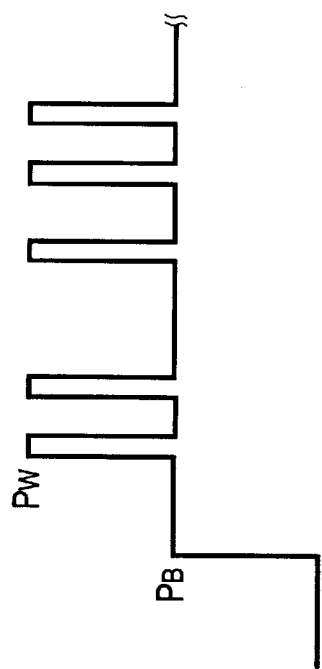

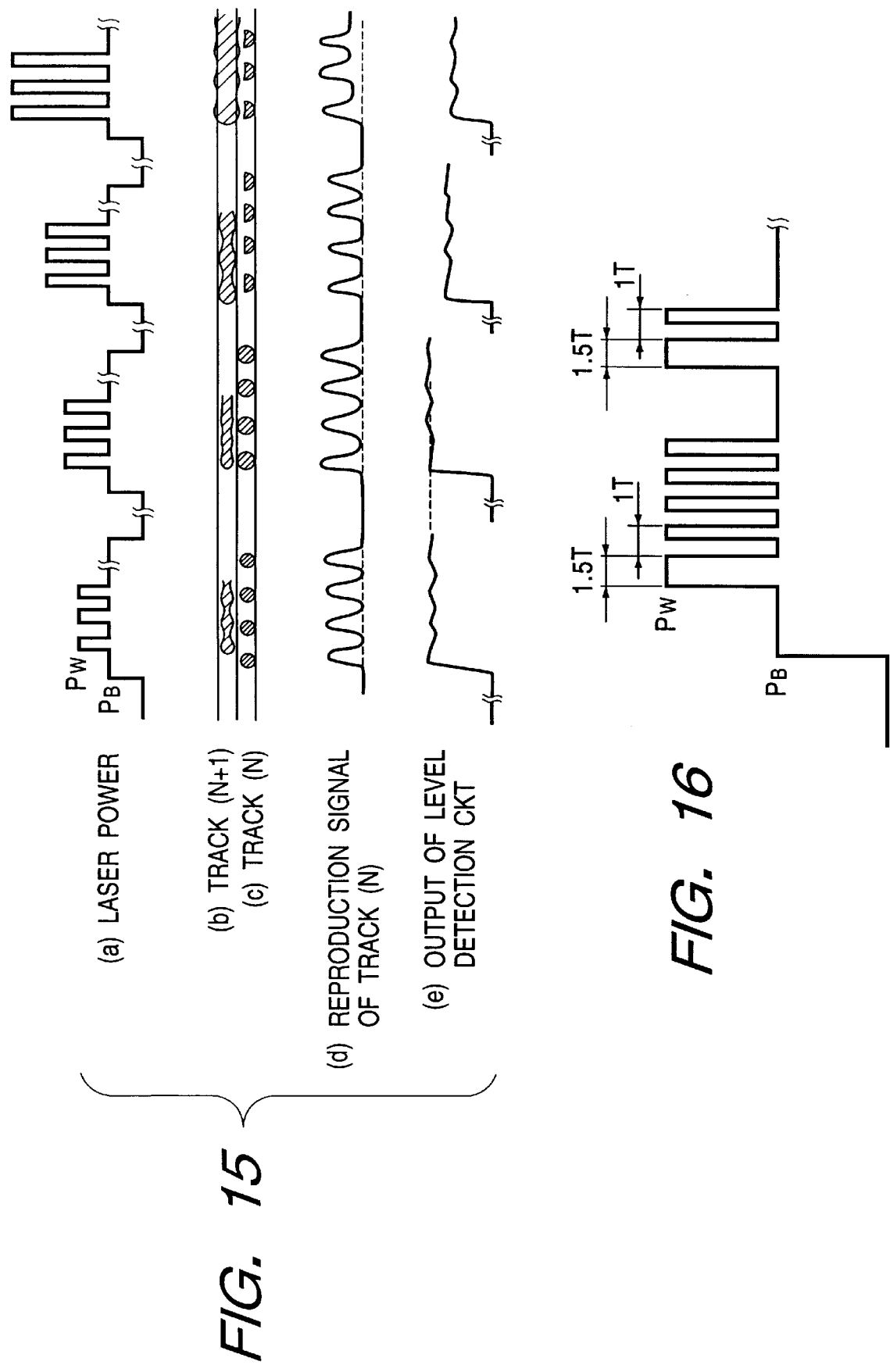

(a) LASER POWER
(b) TRACK (N+1)
(c) TRACK (N)
(d) REPRODUCTION SIGNAL OF TRACK (N)
(e) OUTPUT OF LEVEL DETECTION CKT

TEST RECORDING METHOD AND OPTICAL INFORMATION RECORDING/ REPRODUCING APPARATUS FOR DETERMINING AN OPTIMUM POWER OF THE LIGHT OUTPUT FROM A LIGHT SOURCE IN ERASING PIECES OF INFORMATION RECORDED ON A LAND AND GROOVE OF A RECORDING MEDIUM

BACKGROUND OF THE INVENTION

1. Field of the Invention

The present invention relates to a test recording method of determining the optimum power of a light source with respect to an optical recording medium and, more particularly, to a test recording method in a land/groove recording and an optical information recording/reproducing apparatus using the same.

2. Related Background Art

In recent years, there have been shifts in techniques of increasing the recording densities of optical discs from the CAV scheme using a single channel frequency to the CAV (ZCAV) scheme using a plurality of channel frequencies, and from the mark position recording scheme to the mark edge recording scheme. In addition, techniques for shorter laser wavelengths and more efficient coding have been studied as techniques of achieving higher recording densities. Attention has recently been paid to land/groove recording, in particular, in which lands and grooves are formed on a disc at equal intervals, data are recorded on the lands and the grooves, and crosstalk from adjacent tracks is suppressed by using the interference caused by the optical path differences between the lands and the grooves. Land/groove recording is disclosed in, e.g., Japanese Laid-Open Patent Application Nos. 63-57859, 5-282805, and 2-177027.

Various test recording methods have been proposed and put into practice to ensure compatibility between discs and drive units so as to properly record information. Test recording is performed as follows. Before recording information, test recording is performed on a disc while the recording power is changed. The resultant reproduction signal is evaluated to determine the optimum recording power for recording. For example, known methods of determining optimum power include: a method of detecting the recording power with which the error rate is minimized; a method of detecting the recording power with which the amplitude of the reproduction signal is maximized; and a method of detecting the recording power with which the asymmetry of the reproduction signal becomes 0. There has also been proposed a method of detecting the crosstalk amount of a track adjacent to a track having undergone recording, and determining the optimum power such that the detected crosstalk amount becomes a predetermined amount or less (Japanese Laid-Open Patent Application No. 7-220280).

Although the setting of optimum recording power has been studied, no special consideration has been given to the setting of erasing power.

If inappropriate erasing power is set, information on an adjacent track may be destroyed, resulting in a deterioration in a reproduction signal and a loss of data.

SUMMARY OF THE INVENTION

The present invention has been made in consideration of the above situation, and has as its object to provide a test recording method and an optical information recording/ reproducing apparatus which are suitable for land/groove recording.

In order to achieve the above object, according to the present invention, there is provided a test recording method of determining an optimum power of the light output from a light source in erasing pieces of information recorded on a land and a groove of a recording medium, comprising the steps of recording a predetermined signal on a predetermined track of the medium, erasing data on a track adjacent to the track, on which the signal is recorded, with different erasing powers, reproducing the signal recorded on the track and detecting a reproduction signal, and setting an optimum erasing power on the basis of the reproduction signal and the different erasing powers.

In addition, an optical information recording/reproducing apparatus for executing a test recording method of determining an optimum power of the light output from a light source in erasing pieces of information recorded on a land and a groove of a recording medium, comprises means for recording a predetermined signal on a predetermined track of the medium, means for erasing data on a track adjacent to the track, on which the signal is recorded, with different erasing powers, means for reproducing the signal recorded on the track and detecting a reproduction signal, and means for setting an optimum erasing power on the basis of the reproduction signal and the different erasing powers.

BRIEF DESCRIPTION OF THE DRAWINGS

FIGS. 8A and 8B are illustrations showing laser powers and disc positions in a case in which test recording operations for optimum recording and erasing powers are concurrently performed;

FIG. 9 is a view showing a laser modulation waveform used when data is recorded on a phase change optical disc by mark position recording;

FIG. 15 shows timing charts in (a) through (e) thereof showing signals at the respective components which are obtained when an optimum recording power is obtained in the embodiment in FIG. 12;

FIG. 16 is a graph showing a laser modulation waveform used for mark edge recording on a phase change optical disc;

DETAILED DESCRIPTION OF THE PREFERRED EMBODIMENTS

Figure 1:
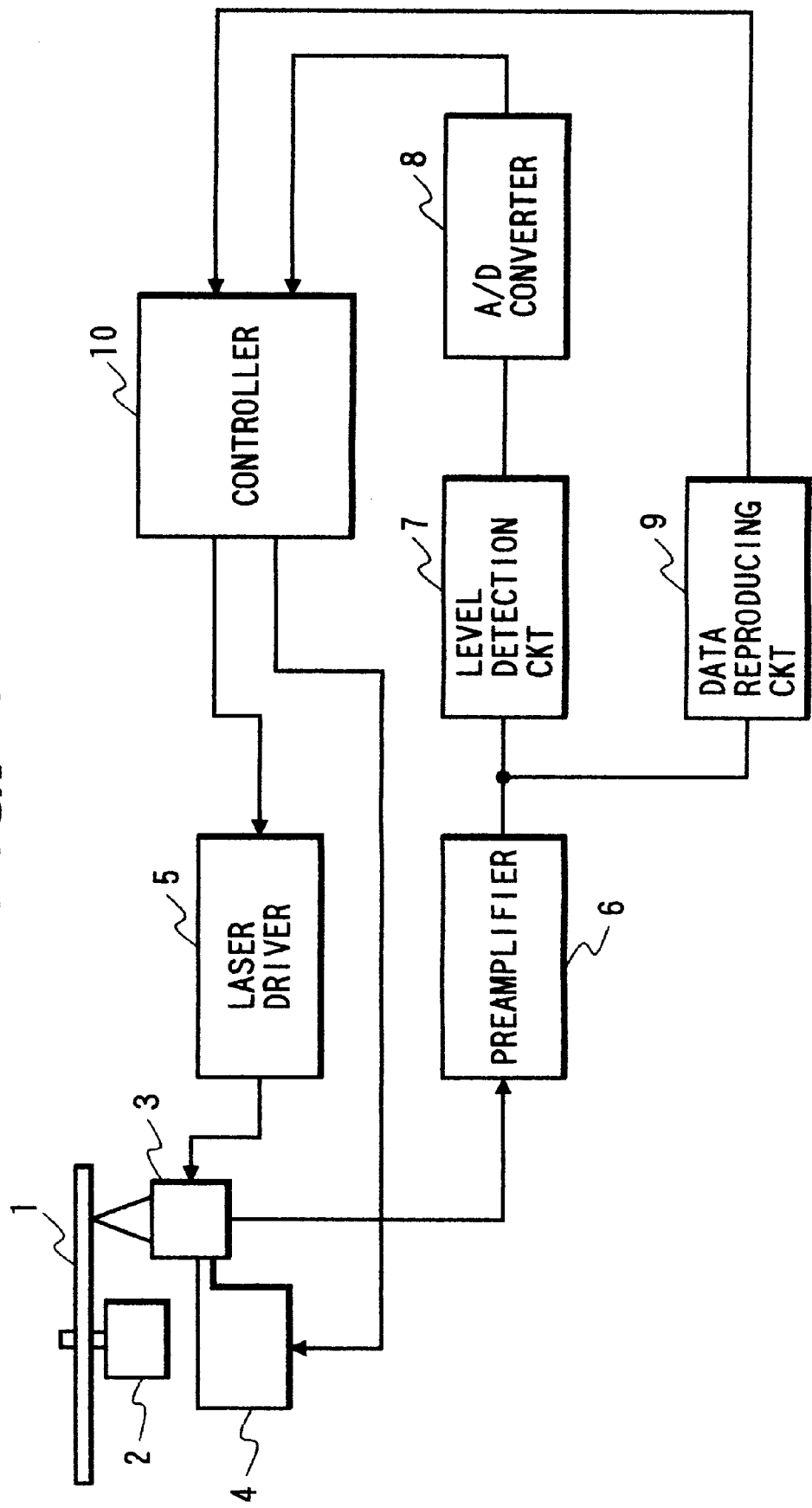
FIG. 1 is a block diagram showing an optical information recording/reproducing apparatus according to an embodiment of the present invention.

Embodiments of the present invention will be described below with reference to the accompanying drawings. FIG. 1 is a block diagram showing an optical information recording/reproducing apparatus according to an embodiment of the present invention. Referring to FIG. 1, an optical disc 1 is an information recording medium serving as a land/groove recording disc, on which lands and grooves are formed at equal intervals. The optical disc 1 is rotated by a spindle motor 2 at a predetermined speed. An optical unit 3, for recording/reproducing information on/from the lands and grooves of the optical disc 1 upon irradiation of a light beam, is arranged below the optical disc 1. The optical unit 3 comprises a semiconductor laser as a light source, an objective lens for focusing a laser beam from the laser into a small light spot, and various optical elements, such as a photosensor, for receiving light reflected by the disc 1. The optical unit 3 can be driven by an optical unit driving system 4 to move in the radial direction of the disc 1 so as to access a desired track on the disc 1.

A laser driver 5 is a laser driving circuit for driving the semiconductor laser in the optical unit 3 under the control of a controller 10. In recording information, the laser driver 5 modulates the light output from the semiconductor laser, and irradiates it on the disc 1, thereby recording information on the disc 1. In reproducing information, the laser driver 5 controls the light output from the semiconductor laser to a predetermined low power. A preamplifier 6 performs current/voltage conversion of an output signal from the photosensor in the optical unit 3 to output a reproduction signal. Each track of the disc 1 is divided into a plurality of sectors, and each sector consists of a preformatted ID section and an MO section on which data is recorded. Each section is reproduced in accordance with the output signal from the photosensor, in the optical unit 3, which receives reflected light of a reproducing beam. The reflected light received by the photosensor in the optical unit 3 is current/voltage-converted by the preamplifier 6 and output as a reproduction signal to a data reproducing circuit 9.

The data reproducing circuit 9 performs a predetermined signal process by using the reproduction signal to convert the data on the disc 1 into data in a form that allows the controller 10 to identify the data, thereby generating reproduction data. The controller 10 obtains the position information of the light beam from the optical unit 3 on the basis of the reproduction data of the ID section, and can recognize the specific position of the laser spot on the disc 1. The controller 10 also controls the optical unit driving system 4 on the basis of the obtained position information to control the optical unit 3 to access a target position on the disc 1.

A level detection circuit 7 detects the amplitude level of the reproduction signal. The detected amplitude level is taken by the controller 10 through an A/D converter 8. The level detection circuit 7 is used in test recording. The optimum recording power of the semiconductor laser is determined on the basis of the amplitude level of the reproduction signal, as will be described in detail later. The controller 10 is the main control circuit of the optical information recording/reproducing apparatus of this embodiment. The controller 10 controls the laser driver 5, the optical unit driving system 4, and the like, to record information on the disc 1 or to reproduce the recorded information therefrom. As will be described in detail later, the controller 10 controls the respective components to perform test recording on the disc 1 so as to determine the optimum recording power, the optimum erasing power, and the like.

Figure 2:
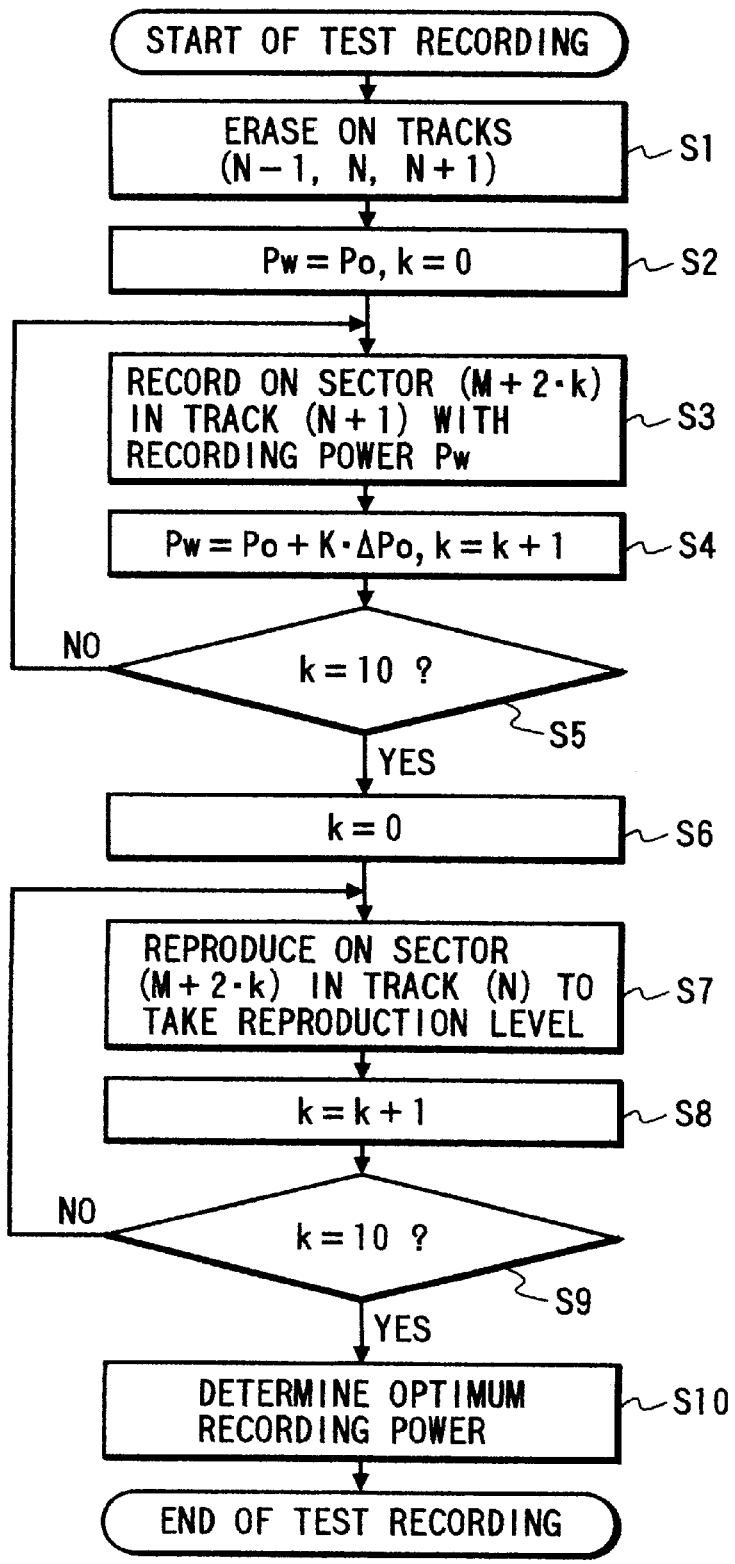
FIG. 2 is a flow chart showing a test recording method according to the first embodiment of the present invention.
Figure 3:
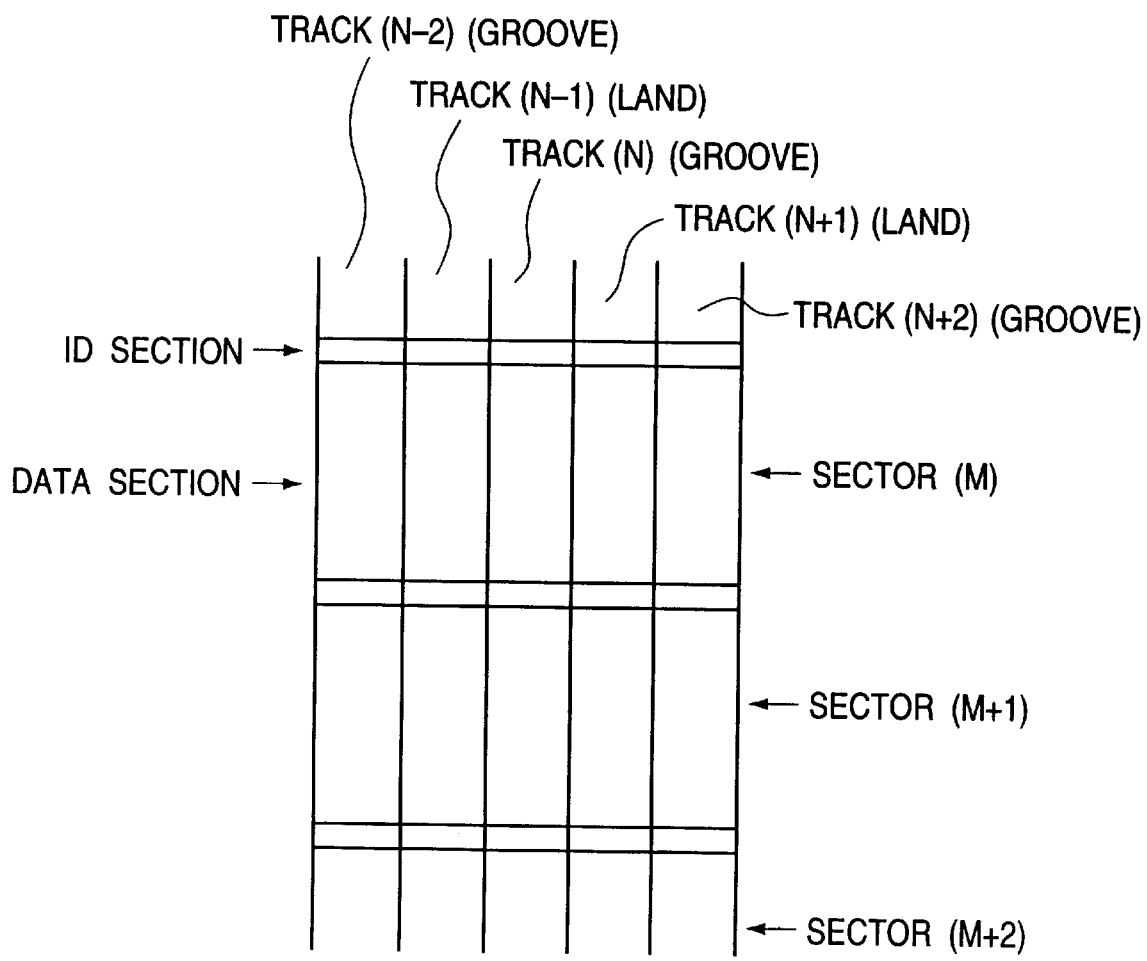
FIG. 3 is a view showing the test recording area of a disc.

FIG. 2 is a flow chart showing a test recording method according to the first embodiment of the present invention which is used for the apparatus in FIG. 1. Assume that this test recording is performed while the disc 1 is set in the apparatus. In the first embodiment, a magneto-optical disc is used as the disc 1, an optical modulation scheme is used as the recording scheme, and mark position recording, as the recording form. Referring to FIG. 2, when the disc 1 is set in the apparatus, the controller 10 erases the data on tracks (N-1, N, N+1) in the test recording area of the disc 1 (step S1). FIG. 3 shows this test recording area. In this embodiment, in the test recording area in FIG. 3, track (N) (groove) and track (N+1) (land) are used. However, the data on track (N-1) is also erased to eliminate the influence of crosstalk from track (N-1).

Of the tracks in the test recording area in FIG. 3, track (N+2) is not directly used for test recording. However, track (N+2), which is adjacent to track (N+1), is ensured as a buffer area because the data in other areas may be destroyed during test recording. To perform erasing in step S1, a bias magnet (not shown) in FIG. 1 is driven to apply a magnetic field from the bias magnet onto the disc 1 in the erasing direction. While this magnetic field is applied, a light beam with a predetermined erasing power based on the recording power is projected from the optical unit 3 to trace tracks (N-1, N, N+1) of the disc 1. This erasing power is preferably set to be relatively high so as to reliably erase the data on the track in the test recording area because no problems are posed in terms of cross-write with respect to the adjacent tracks.

When erasing is complete, the controller 10 starts test recording in the test recording area in FIG. 3. More specifically, first of all, the controller 10 sets the initial value of recording power $P_W$ to $P_0$, and sets a value k, designating a recording power and a sector on which data is to be recorded, to 0 (step S2). The controller 10 then records a predetermined signal pattern on sector (M+2·k) in track (N+1) with the recording power $P_W=P_0+k \cdot \Delta P$ (step S3). In this case, since k=0, the signal pattern is recorded on sector (M) in track (N+1) with the recording power $P_W=P_0$. When recording on sector (M) is complete, the controller 10 adds 1 to the value k, and sets the recording power to $P_W=P_0+\Delta P$ (step S4). The controller 10 then checks whether k=10 (step S5). Since k=1 in this case, the flow chart returns to step S3 to record a predetermined signal pattern on sector (M+2·k) with the recording power $P_W=P_0+\Delta P$. In this case, since k=1, the controller 10 records the signal pattern on sector (M+2), skipping sector (M+1).

Figure 4:
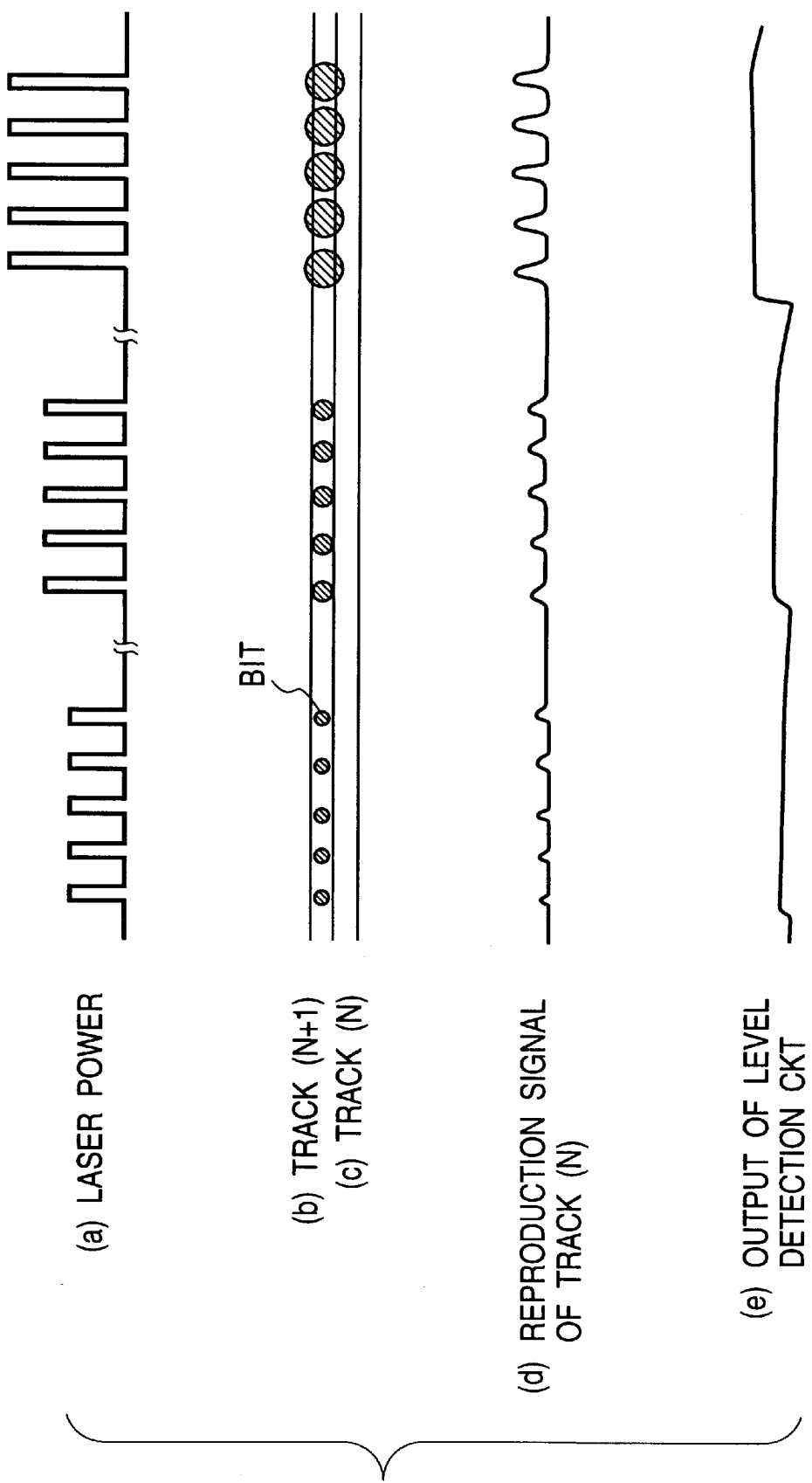
FIG. 4 shows timing charts in (a) through (e) thereof, showing signals at the respective components in the process of test recording in the embodiment in FIG. 2.

The processing in steps S3 to S5 is repeated in this manner to perform recording on sector (M), sector (M+2), sector (M+4), . . . , i.e., every other sector, while increasing the recording power in units of sectors. FIG. 4(*a*) shows the recording power (laser power) in this operation. As described above, the recording power stepwise increases in increments of ΔP and reaches the maximum value at the last sector. In this embodiment, recording is complete when k=10 in step S5. That is, the final value of k is 9. When k=0, the minimum value $P_0$ of the recording power is sufficiently lower than the power that causes cross-write. The maximum value $(P_0+9 \cdot \Delta P_0)$ of the recording power when k=9 is set to the power that reliably causes cross-write.

Recording is to be performed by irradiating a disc with a light beam with the above recording power from the optical unit 3 onto the disc 1 while applying a recording magnetic field from the bias magnet (not shown) in FIG. 1 onto the disc 1 in a direction opposite to the erasing direction. FIG. 4(*b*) shows the pits recorded on track (N+1) by the above test recording. As is apparent from FIG. 4(*b*), as the recording power increases, the pits gradually increase in size, resulting in cross-write on adjacent tracks. In this embodiment, the time required to change the power of the semiconductor laser is ensured by performing test recording on every other sector.

When recording is complete, the controller 10 traces track (N) adjacent to track (N+1), which has previously undergone recording, with a reproducing beam and detects the reproduction signal level. More specifically, the controller 10 sets k=0 (step S6) first. The controller 10 then reproduces the data on sector (M+2·k) in track (N) (step S7). In this case, since k=0, the data on sector (M) in track (N) is reproduced. The reproduction level is detected by the level detection circuit 7 and taken by the controller 10 through the A/D converter 8. The controller 10 stores the obtained reproduction level in correspondence with the sector number. However, no data is recorded on track (N), and hence this track is not recognized as data. Since sector (M) in track (N) is adjacent to sector (M) in track (N+1), the detected reproduction level contains crosstalk components from track (N+1). Subsequently, the controller 10 sets k=k+1 (step S8), and checks whether k=10 (step S9). In this case, since k=1, the flow returns to step S7 to reproduce the data on sector (M+2), in track (N), which is designated by k=1. Similarly, sector (M+2) in track (N) is adjacent to sector (M+2), in track (N+1), on which test recording has previously been performed. The reproduction level is detected by the preamplifier 6 and taken by the controller 10 through the A/D converter 8. The obtained reproduction level is stored in the memory in correspondence with the sector number in the same manner as described above.

The controller 10 repeats the processing in steps S7 to S9 to reproduce the data on sector (M), sector (M+2), sector (M+4), . . . , i.e., every other sector, in track (N). That is, the controller 10 sequentially reproduces the sectors adjacent to the sectors, in track (N+1), on which test recording has been performed, and stores the obtained reproduction levels in the memory in correspondence with the sector numbers. FIG. 4(*d*) shows the reproduction signal of track (N). The amplitude level of the reproduction signal increases in accordance with the size of the pit on track (N+1), i.e., the magnitude of the laser power in test recording. FIG. 4(*e*) shows the output signal from the level detection circuit 7. The level detection circuit 7 has peak holding characteristics, and holds the peak value of the reproduction signal in FIG. 4(*d*) to detect it as the signal reproduction level in FIG. 4(*e*). In this embodiment, with such peak holding characteristics, the level of a reproduction signal can be detected with high sensitivity independently of the modulation pattern in test recording. In consideration of detection errors due to noise, it is preferable that, for example, a plurality of level data of a reproduction signal be sampled within the reproduction interval of a predetermined sector, and the sampled data be averaged to eliminate the influence of the noise.

Assume that an average value detector is used as the level detection circuit 7. In this case, although the influence of noise can be reduced by increasing the time constant, sensitivity deteriorates. In order to improve the sensitivity, a high-density pattern is preferably used as the pattern of a modulation signal in test recording. A modulation signal used in test recording may be generated by a test recording signal generator arranged in the controller 10. Alternatively, a signal pattern generated according to a modulation rule used in normal recording may be used. With the use of such a signal pattern, the arrangement of the apparatus can be simplified. However, in order to improve precision, the signal pattern is preferably a single frequency signal. Especially when the average value detector is used as the level detection circuit 7 as described above, since the output depends on the signal pattern, the signal pattern is most preferably a single frequency signal to detect the cross-write amount of an adjacent track. In normal data recording, an ECC for error correction is added to the trailer portion of one-sector data. For this reason, in test recording, level data must be taken while this ECC portion is avoided, or a recording mode without addition of ECCs must be used.

Figure 5:
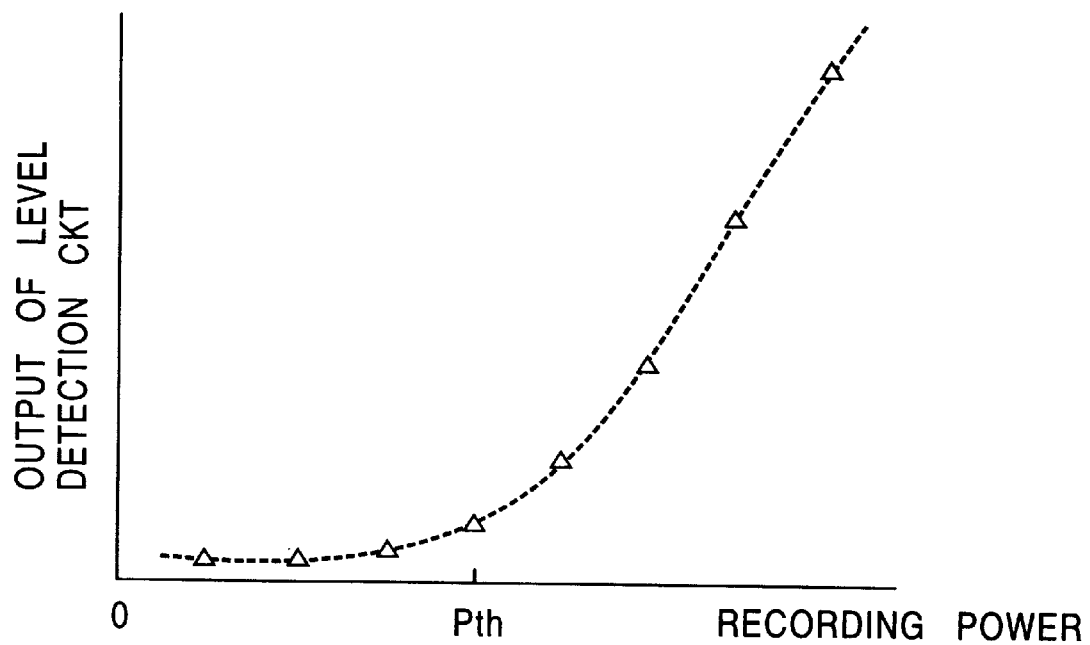
FIG. 5 is a graph showing the relationship between the recording power and the output from a level detection circuit which is obtained by test recording in the embodiment in FIG. 2.

Referring back to FIG. 2, if k=10 in step S9, the controller 10 terminates the reproduction of the data on track (N). The controller 10 then determines the optimum recording power of the semiconductor laser on the basis of the relationship between the recording power for the k sectors in track (N+1) and the reproduction level of the k sectors upon reproduction of the data on track (N) (step S10). FIG. 5 shows the relationship between the recording power for track (N+1) and the reproduction signal level of track (N). Referring to FIG. 5, the reproduction signal level gradually increases until the recording power reaches $P_{TH}$. This phenomenon indicates that the pits on track (N+1) gradually increase in size, as shown in FIG. 4(*b*). This gradual increase in pit size is detected on the basis of crosstalk during reproduction.

When the recording power exceeds $P_{TH}$, the reproduction signal level abruptly increases. This indicates that cross-write with respect to track (N) has started, and the cross-write components on track (N) are detected as the reproduction level. The controller 10 obtains the recording power $P_{TH}$ at the inflection point by arithmetic operations on the basis of the relationship between the recording power and the reproduction signal power in FIG. 5, and determines the obtained recording power as the optimum recording power. The controller 10 controls the laser driver 5 to set the recording power of the semiconductor laser to the optimum recording power. Subsequently, the controller 10 records data on the disc with the obtained optimum recording power. With this operation, the test recording process is complete.

The optimum recording power may be determined as follows. The recording power $P_{TH}$ at the inflection point is multiplied by a constant in consideration of a margin. The result value is determined as the optimum recording power. Alternatively, the recording power with which a predetermined reproduction signal level is obtained, is multiplied by a constant. The result value is determined as the optimum recording power. In an apparatus based on a scheme in which the linear velocity changes in accordance with the radial position on the disc 1, since the linear velocity changes in accordance with the recording position, the optimum recording power must be changed in accordance with the recording radial position. In this case, an optimum recording power may be obtained at a predetermined radial position, and the optimum recording power corresponding to each radial position on the disc 1 may be calculated by proportionality computations. In order to obtain a more accurate optimum recording power corresponding to each radial position on the disc 1, it is preferable that the above test recording be performed on a plurality of radial positions on the disc 1 to obtain optimum recording powers, interpolation processing be performed by using the obtained optimum recording powers, and the radial positions on the disc 1 and the corresponding optimum recording powers be stored in the form of a data table in the controller 10.

The above description is associated with the test recording method used when mark position recording is performed, as described above. In such mark position recording, when an optimum recording power is to be determined to obtain an optimum reproduction signal, without any consideration of cross-write, the range of choices of optimum recording power can be regarded as relatively wide. This is because, even if the recording power is increased/decreased, only the pits increase in size in the form of circles, and the correlation between the center of a given pit recorded as information and the center of the next pit undergoes no great change. Variations in reproduction signal level due to variations in recording power affect the quality (as the S/N ratio) of the reproduction signal. If, however, a generally required error rate is to be ensured, the power margin is relatively wide.

As is apparent from the comparison between this method and the method of forming circular pits with a modulation waveform in the form of a single pulse, and the determination of the optimum recording power from cross-write components from an adjacent track, as shown in FIG. 4(a), the optimum recording power determined in consideration of cross-write as in this embodiment is lower than that determined to optimize the S/N ratio disregarding cross-write as in the above case. That is, when data is recorded with the optimum recording power determined by the method of this embodiment, although the S/N ratio is lower than that in the conventional scheme, the required error rate can be ensured because of the wide power margin, as described above.

Figure 6:
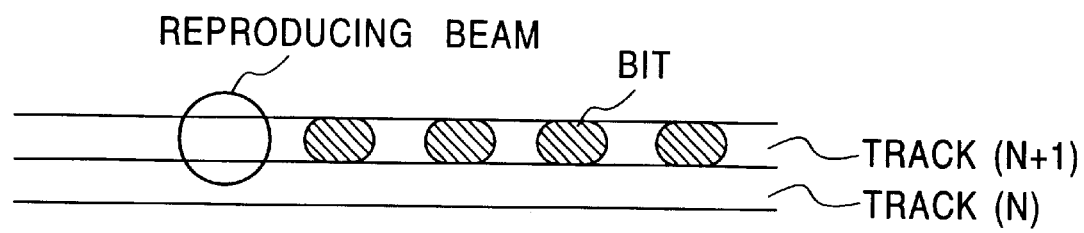
FIG. 6 is a view showing 50% duty pits which are recorded by test recording with the optimum S/N ratio.

Assume that cross-write is to be prevented without any limitations on the modulation waveform and without meeting the condition that circular pits should be formed. In this case, as shown in FIG. 6, the pit shape with which the duty of the highest-density pattern becomes 50% is the optimum shape in terms of S/N ratio. To form such pits, the laser modulation method must be modified somehow. The optimum recording power obtained to optimize the S/N ratio by forming pits like those shown in FIG. 6 may take a value close to that of the optimum recording power obtained by the method of this embodiment. In this case, as is apparent, the lower recording power is preferably used. Therefore, when optimum recording powers are obtained by different methods in this manner, better test recording can be realized by determining the lowest recording power as the optimum value.

A method of determining the laser power in a normal erasing operation will be described next. In one method of determining the erasing power, the optimum recording power obtained by the above method is multiplied by a predetermined value equal to or smaller than 1, and the product is determined as an erasing power. This predetermined value is determined in accordance with the thermal characteristics of the medium used, the linear velocity, and the like. However, the optimum recording power is an optimum value in the pulse ON period, and the pulse ON waveform (laser modulation waveform) considerably varies among apparatuses. In consideration of these factors, a sufficient precision may not be obtained by this method, although the method is simple. However, this method is effective for the following reason. Since the semiconductor laser is continuously turned on during erasing, even if cross-erase equivalent to cross-write occurs, the cross-erase components can be separated from the signal band, and only a drop in the carrier level takes place. That is, the damage caused by cross-erase is smaller than that caused by cross-write, and a wider margin can be expected accordingly.

Another method of determining the erasing power will be described next. This method differs from the method of obtaining an optimum recording power in the modulation waveform of the laser beam. More specifically, the pulse width of the modulation waveform is set to equalize the inflow and outflow amounts of heat on the disc 1. That is, the pulse width is set to be equal to or longer than the time required to reach a saturated state. In this saturated state, the spread of each pit in the radial direction is equal to that in a continuous ON period. According to the experiment conducted by the present inventors using a magneto-optical disc, when this width was set to be four times or more larger than the radius (the distance given by $1/e^2$) of the laser beam, the precision requirement could be satisfied.

Figure 7:
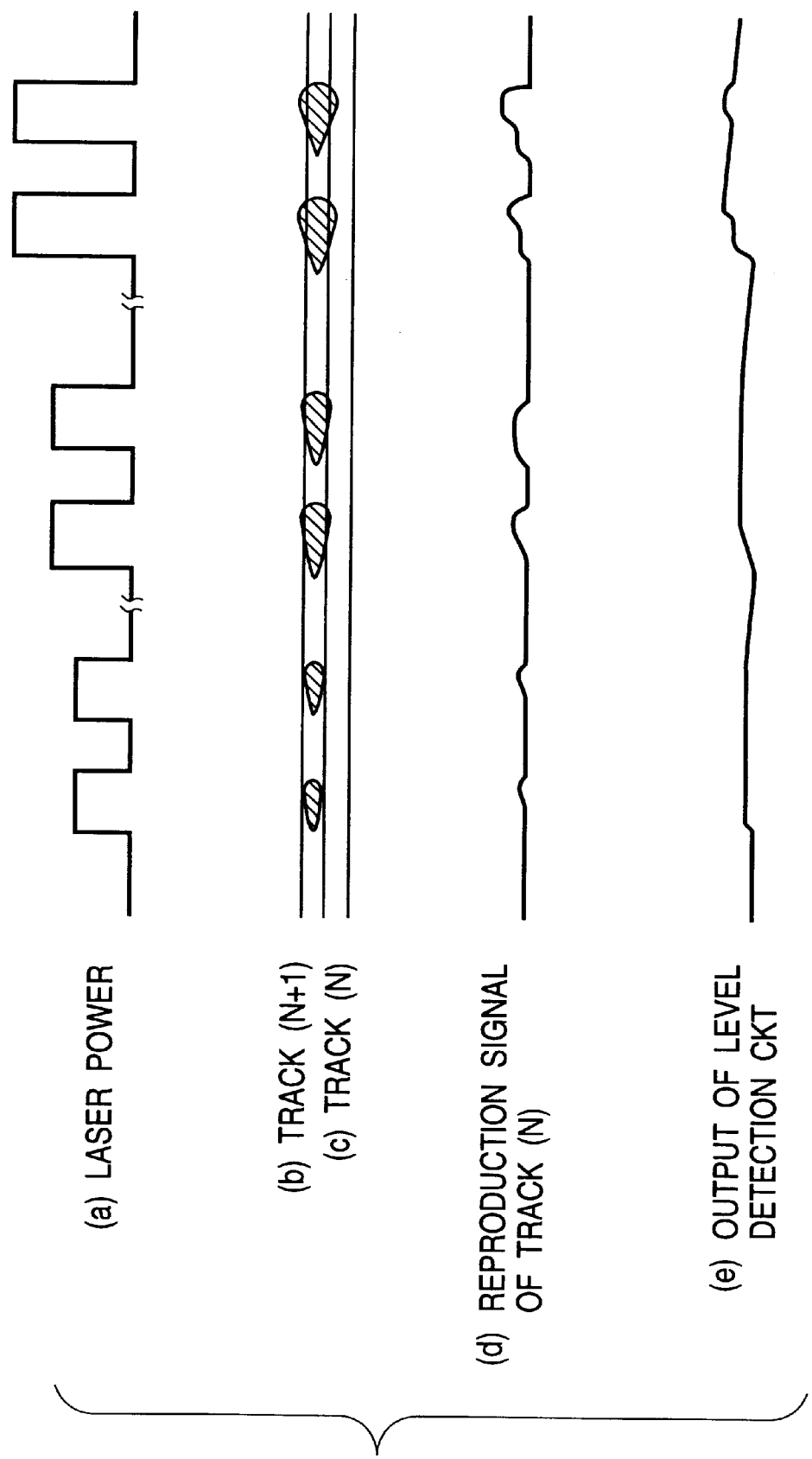
FIG. 7 shows timing charts in (a) through (e) thereof showing signals at the respective components which are obtained when an optimum recording power is obtained in test recording on a magneto-optical disc.

This method will be described in detail. The controller 10 performs the processing in FIG. 2 to determine the optimum erasing power on the basis of the resultant recording powers and reproduction signal levels. FIGS. 7(a) to 7(e) show the signals appearing at the respective portions in this case. FIG. 7(a) shows the laser power, which increases step by step, as in the above case. The pulse width of the laser power in this case is set to equalize the inflow and outflow amounts of heat on the disc 1 at the trailing edge of the pulse, as described above. FIG. 7(b) shows the pits recorded on track (N+1) with this laser power. FIG. 7(c) shows the state of track (N) adjacent to track (N+1). When the data on track (N) in FIG. 7(c) is reproduced, the reproduction signal in FIG. 7(d) is obtained. The reproduction signal level in FIG. 7(e) is further obtained by the level detection circuit 7.

The controller 10 determines the optimum erasing power on the basis of the recording power and the reproduction level in the same manner as described above. In this case, in order to obtain an optimum recording power and an optimum erasing power in a short period of time, test recording is preferably performed in accordance with the following procedure. Signal patterns are recorded on the disc 1 by using the same recording power with modulation waveforms (pulse widths) for evaluating the recording and erasing powers. FIG. 8A shows the profile of the laser power in this case. Signal patterns for obtaining recording and erasing powers are respectively recorded on the first and second half portions of each sector. When the data on track (N) is to be reproduced, the reproduction levels of each sector are independently set in accordance with the two signal patterns and stored in the memory. FIG. 8B shows the relationship between the laser power and the disc position. As described above, the two signal patterns are recorded on sector (M), sector (M+2), . . . , by using the same laser power with the different modulation waveforms.

With this operation, since testing for detecting the optimum recording and erasing powers can be concurrently performed, the frequency of power switching and seek operations for desired sectors can be reduced. As a result, the test time required can be shortened.

The above description is associated with the test recording method used when land/groove recording is performed on a magneto-optical disc by the optical modulation scheme. Other test recording methods will be described next. A test recording method used when land/groove recording is performed on a magneto-optical disc by a magnetic field modulation scheme will be described first. In an apparatus based on this scheme, when information is to be recorded, the laser driver 5 in FIG. 1 continuously turns on the semiconductor laser at a predetermined recording power to scan tracks of the disc 1 with a light beam having a predetermined intensity. In addition, a magnetic field modulated in accordance with the information to be recorded is applied from a magnetic head (not shown) onto the disc 1. The data is recorded on the disc 1 upon irradiation of the disc with the light beam and application of the modulated magnetic field. In this recording scheme, since recording and erasing are simultaneously performed (overwrite), there is no distinction between the optimum recording power and the optimum erasing power. In addition, this recording scheme is suitable for mark edge recording. The optimum recording power can be obtained by simply detecting the maximum power with which the generated heat has no effect on adjacent tracks when the semiconductor laser is continuously turned on, regardless of the type of recording scheme, e.g., mark position recording or mark edge recording.

Test recording on a magneto-optical disc is performed in the magnetic field modulation scheme in accordance with the flow chart of FIG. 2 as in the case of the optical modulation scheme. More specifically, first of all, the controller 10 erases the data in the test recording area in step S1, as shown in FIG. 2. When erasing is to be performed, a current (to be referred to as a current in the erasing direction for the sake of convenience) is supplied to the magnetic head (not shown) in a predetermined direction to apply a magnetic field to the disc 1 in the erasing direction. In addition, the semiconductor laser in the optical unit 3 is continuously turned on at a power high enough for erasing. The resultant light beam is scanned on the tracks in the test recording area of the disc 1. When erasing is complete, the controller 10 sets $P_W = P_0$ and k=0 in step S2, and repeats the processing in steps S3 to S5 to record a predetermined signal on every other sector while increasing the recording power, as in the above case. As described above, this signal is recorded upon irradiation of the disc with the light beam with the predetermined intensity and application of the modulated magnetic field. In this case, an arbitrary modulation signal pattern can be formed. However, as described above, a signal generator may be used to form a signal pattern for test recording. Alternatively, a signal pattern formed according to a modulation rule used for normal recording may be used. When an average value detector is used as the level detection circuit 7, the signal pattern preferably has a single period.

When recording is complete, the controller 10 sets k=0 in step S6, and repeats the processing in steps S7 to S9 to reproduce the data on sector (M), sector (M+2), sector (M+4), . . . , i.e., every other sector, in track (N) adjacent to track (N+1). Every time the data on one sector is reproduced, the level of the reproduction signal is detected by the level detection circuit 7. The controller 10 takes the reproduction signal level through the A/D converter 8, and stores it in the memory in correspondence with the sector number. When reproduction of the data on predetermined sectors is complete, the controller 10 determines the optimum recording power on the basis of the relationship between the recording powers and the reproduction signal levels, as described above with reference to FIG. 5. With the above operation, test recording is complete. In this case, as described above, since there is no distinction between the optimum recording power and the optimum erasing power, test recording to determine an optimum erasing power need not be performed.

A test recording method for a phase change type optical disc will be described next. When a phase change type optical disc is used, since the recording process differs from that for a magneto-optical disc, the test recording method also slightly differs from the above test recording method for the magneto-optical disc. Recording on a phase change type optical disc is performed by the mark position recording scheme which allows an overwrite, and has currently become the dominating recording technique. FIG. 9 shows the laser modulation waveform used to record data on the phase change type optical disc. Referring to FIG. 9, a bias power $P_B$ is used to erase old data, and a recording power $P_W$ is used to record new data. The bias power $P_B$ must be able to erase the data in a target area, which is the essential object, but must not erase the data on adjacent tracks. This condition will be referred to as condition 1.

Similarly, the recording power $P_W$ must be able to record data, but must not record unnecessary data on adjacent tracks. This condition will be referred to as condition 2. In addition, the recording power $P_W$ must not erase the data on adjacent tracks. This condition will be referred to as condition 3. In normal recording, condition 3 is automatically satisfied when condition 2 is satisfied. The test recording method of the first embodiment can be directly applied to test recording for the acquisition of the optimum recording power $P_W$ based on condition 2. Test recording for the acquisition of the optimum bias power $P_B$ and the optimum recording power $P_W$ based on conditions 1 and 3 will be described later in the fourth embodiment. Condition 2 is less important than condition 3, and requires a shorter time for test recording. In consideration of these factors, the test recording method of the fourth embodiment (to be described later) is preferably used for test recording on a phase type optical disc. In recent years, mark edge recording on a phase change type optical disc in normal land recording is almost a reality. Therefore, the test recording method to be used when mark position recording or lang/groove recording based on mark position recording is performed on a phase change optical disc will be described in detail in the fourth embodiment.

Figure 10:
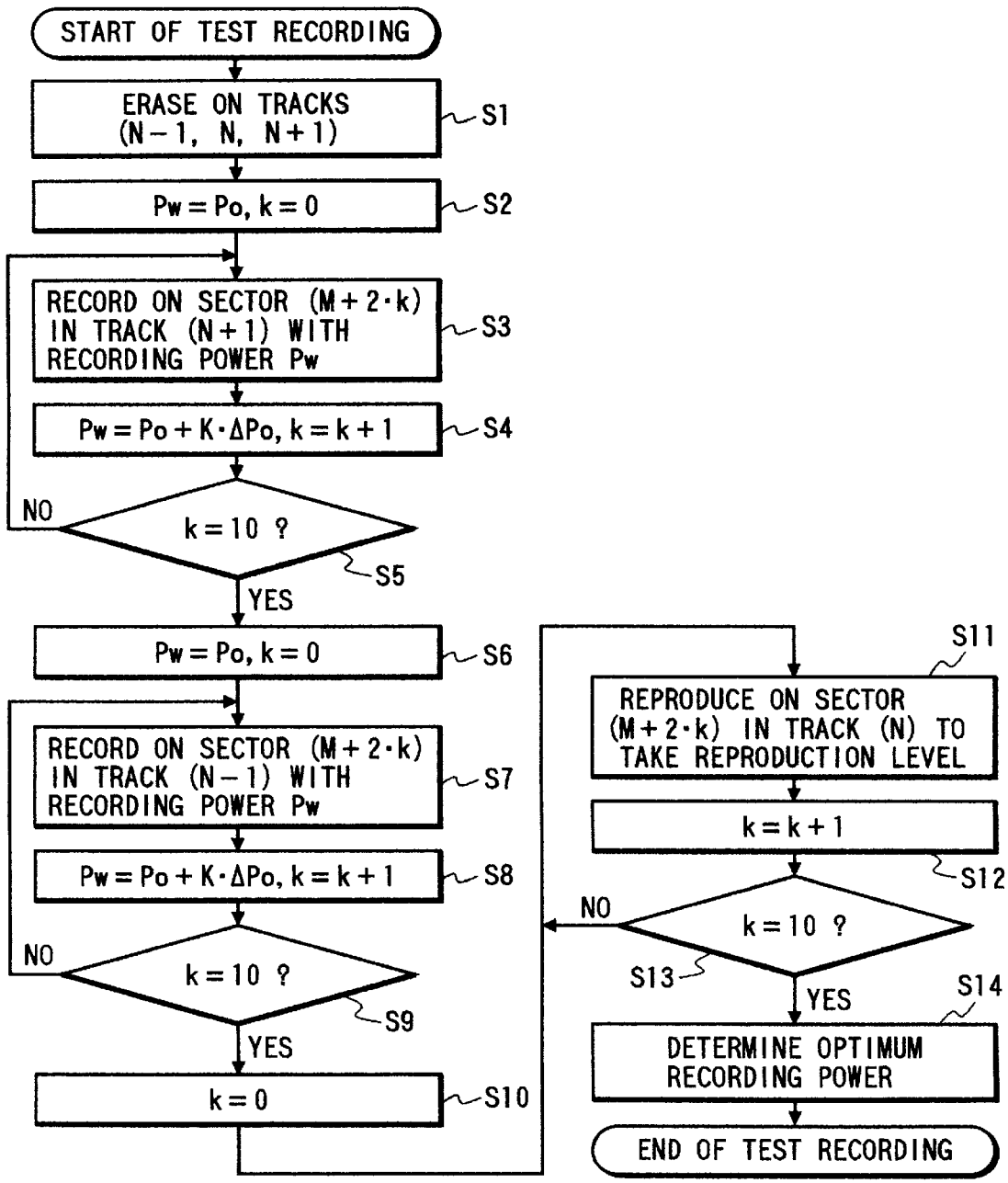
FIG. 10 is a flow chart showing a test recording method according to the second embodiment of the present invention.

The second embodiment of the present invention will be described next. In the first embodiment, a signal is recorded on track (N−1), and the data on adjacent track (N) is reproduced to detect the reproduction level. In the second embodiment, in addition to a signal recorded on track (N−1) in the test recording area in FIG. 3, the identical signal is recorded on track (N+1), and the data on track (N) between these tracks is reproduced to detect the reproduction signal level. FIG. 10 shows a test recording method of this embodiment. The test recording method of the embodiment will be described with reference to FIG. 10, together with FIG. 1. Referring to FIG. 10, in performing test recording, a controller 10 controls the respective components to erase the data in the test recording area of a disc 1 (step S1). In the embodiment, as described above, since data is recorded on track (N+1), the data on three tracks (N−1, N, N+1) in the test recording area in FIG. 3 are erased. If, for example, a magneto-optical disc is used as the disc 1, and the optical modulation scheme is used, a magnetic field is applied from a bias magnet in the erasing direction, and the tracks are traced with a light beam with erasing power from an optical unit 3, thereby erasing the data, as described above.

When erasing is complete, the controller 10 sets a recording power $P_W$ to an initial value $P_0$, and a value k designating a recording power and a sector on which data is to be recorded to 0 (step S2). The controller repeats the processing in steps S3 to S5 to record a signal on track (N+1). More specifically, a predetermined signal is recorded on sector (M+2·k), in track (N+1), which is designated by k=0 with the recording power $P_W$ (step S3). The controller 10 then sets k=k+1 and the recording power $P_W=P_0+k\cdot \Delta P$ to increase the recording power by $\Delta P_0$ (step S4). The controller 10 repeatedly checks whether k=10 (step S5). With this operation, the controller 10 records the predetermined signals on sector (M), sector (M+2), sector (M+4), . . . , i.e., every other sector, in track (N+1), while increasing the recording power $P_W$ by $\Delta P_0$ at a time.

Upon determining in step S5 that k=10, the controller 10 sets $P_W=P_0$ and k=0 again (step S6), and repeats the processing in steps S7 to S9 to record signals on track (N−1) as in the case with track (N+1). More specifically, the signals are recorded on sector (M), sector (M+2), sector (M+4), . . . , i.e., every other sector, in track (N−1), while increasing the recording power by $\Delta P_0$ at a time. With this operation, the signals are recorded on alternate sectors, in both tracks (N+1, N−1), which oppose each other with the same recording power.

Upon determining in step S9 that k=10, the controller 10 sets k=0 (step S10), and repeats the processing in steps S11 to S13 to reproduce the data on track (N). In this case, the controller 10 reproduces the data on sector (M), sector (M+2), sector (M+4), . . . , i.e., every other sector, in track (N), and causes a level detection circuit 7 to detect reproduction signal levels including cross-write components from the respective sectors in tracks (N−1, N+1). The controller 10 takes the obtained reproduction signal levels through an A/D converter 8, and stores them in correspondence with the sector numbers. If it is determined in step S13 that k=10, and reproduction of the data on all the sectors in track (N) is complete, the controller 10 determines an optimum recording power on the basis of the relationship between the recording powers and the reproduction signal levels (step S14). As the optimum recording power, a power obtained by arithmetic processing for a recording power $P_{TH}$ at an inflection point is determined, as described with reference to FIG. 5.

In this embodiment, since identical signals are recorded on two tracks (N+1, N−1), the time required for test recording is prolonged by the time required to record the signals on track (N−1). However, since track (N) as a reproduction track is influenced by cross-write from the two adjacent tracks on both sides, test recording can be performed in a state closer to that in actual operation. The second embodiment can therefore obtain a more ideal optimum recording power than the first embodiment. Similar to the first embodiment, the second embodiment can be applied to land/groove recording based on the optical modulation scheme on a magneto-optical disc, land/groove recording based on the magnetic field modulation scheme on a magneto-optical disc, and the like.

Figure 11:
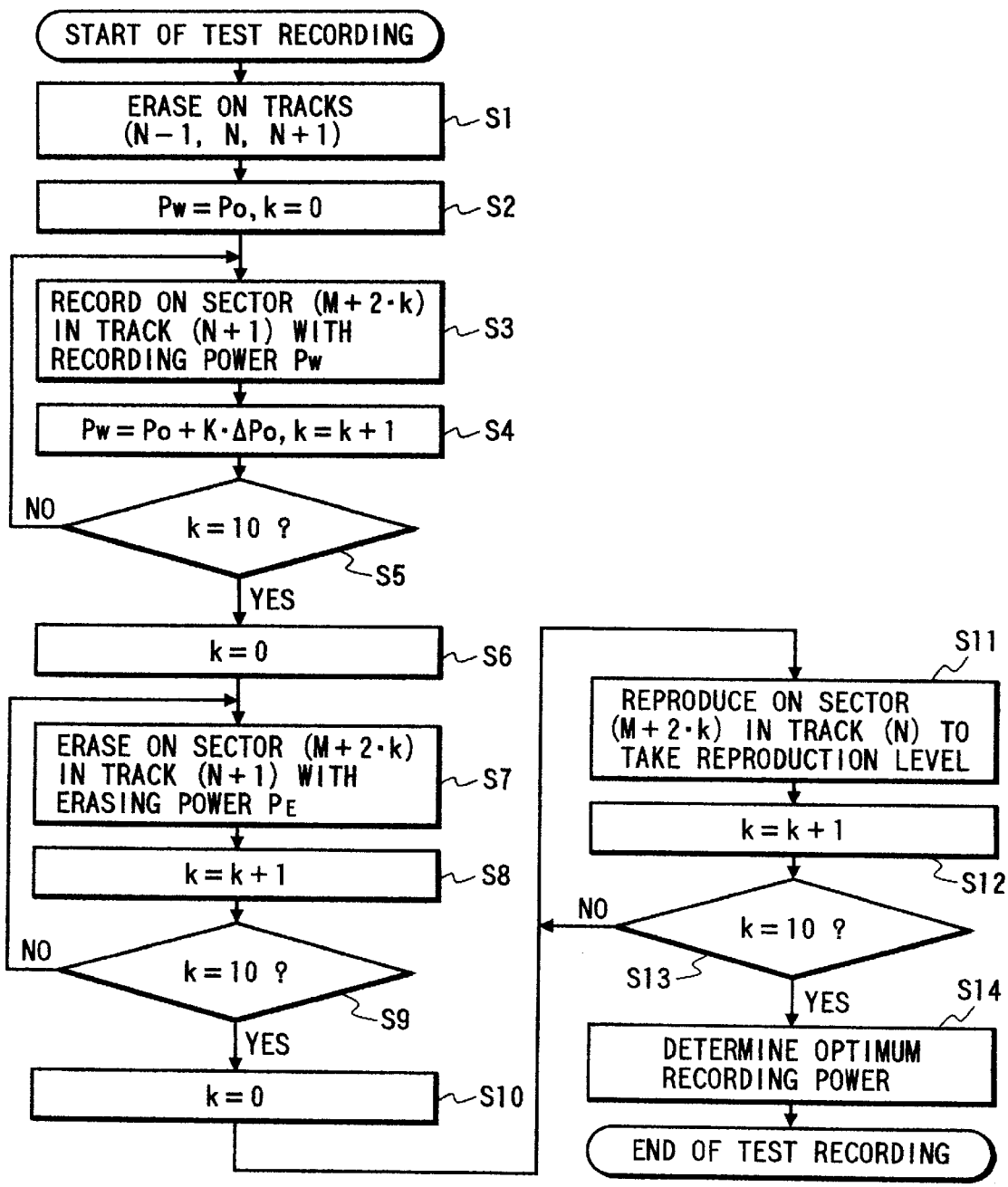
FIG. 11 is a flow chart showing a test recording method according to the third embodiment of the present invention.

The third embodiment of the present invention will be described next. In this embodiment, the data on track (N+1) is erased before a signal is recorded on track (N+1) and the data on track (N) is reproduced. The second embodiment differs from the first embodiment only in this respect. FIG. 11 shows a test recording method of the second embodiment. The embodiment will be described with reference to FIG. 11, together with FIG. 1. Referring to FIG. 11, a controller 10 erases the data on track (N−1) and track (N+1) in a test recording area (step S1). The controller 10 sets a recording power $P_W=P_0$ and k=0 (step S2), and repeats the processing in steps S3 to S5 to record predetermined signals on track (N+1). The processing in steps S3 to S5 is the same as that in FIGS. 2 and 10. That is, predetermined signals are recorded on sector (M), sector (M+2), sector (M+4), . . . , i.e., every other sector, in track (N+1), while the recording power is increased by $\Delta P_0$ at a time.

Upon determining in step S10 that k=10, the controller 10 sets k=0 (step S6), and repeats the processing in steps S7 to S9 to erase the data previously recorded on track (N+1). More specifically, the controller 10 erases the data on sector (M+2·k) designated by the value of k with an erasing power $P_E$ (step S7), repeatedly checks whether k=k+1 (step S8) and k=10 (step S9), thereby sequentially erasing the data on sector (M), sector (M+2), sector (M+4), . . . , in track (N+1). The erasing power $P_E$ is set to a power sufficiently lower than the power that causes cross-erase. As is apparent, in this case, some data are left on track (N+1), but crosstalk from track (N+1) can be satisfactorily reduced. In erasing, a magnetic field is applied from a bias magnet onto an disc 1 in accordance with the optical modulation scheme, the magnetic field modulation scheme, or the like.

When erasing is complete, the controller 10 sets k 0 (step S10), and repeats the processing in steps S11 to S13 to reproduce the data on track (N) adjacent to track (N+1). More specifically, the controller 10 reproduces the data on sector (M), sector (M+2), sector (M+4), . . . , i.e., every other sector, in track (N), and causes a level detection circuit 7 to detect the reproduction signal levels in units of sectors. The controller 10 then takes the obtained reproduction signal levels through an A/D converter 8 and stores them in a memory. Upon determining in step S13 that k=10, the controller 10 determines an optimum recording power on the basis of the relationship between the recording powers and the reproduction signal levels in the same manner as described above (step S14).

In this embodiment, since the signals recorded on track (N+1) are erased before the data on track (N) is reproduced, the crosstalk component from track (N+1) can be reduced upon reproduction of the data on track (N). As a result, the detection precision improves, and a more ideal optimum recording power can be obtained. Similar to the first embodiment, the third embodiment can be used in land/groove recording based on an optical modulation scheme on a magneto-optical disc, and it can be used in a land/groove recording based on a magnetic field modulation scheme on a magneto-optical disc, and the like. In addition, to obtain an optimum erasing power in the optical modulation scheme using a magneto-optical disc, an optimum recording power may be multiplied by a predetermined value equal to or larger than one as described above. Alternatively, the laser modulation waveform may be changed in signal recording, and the erasing power may be determined by the same method as described above.

Figure 12:
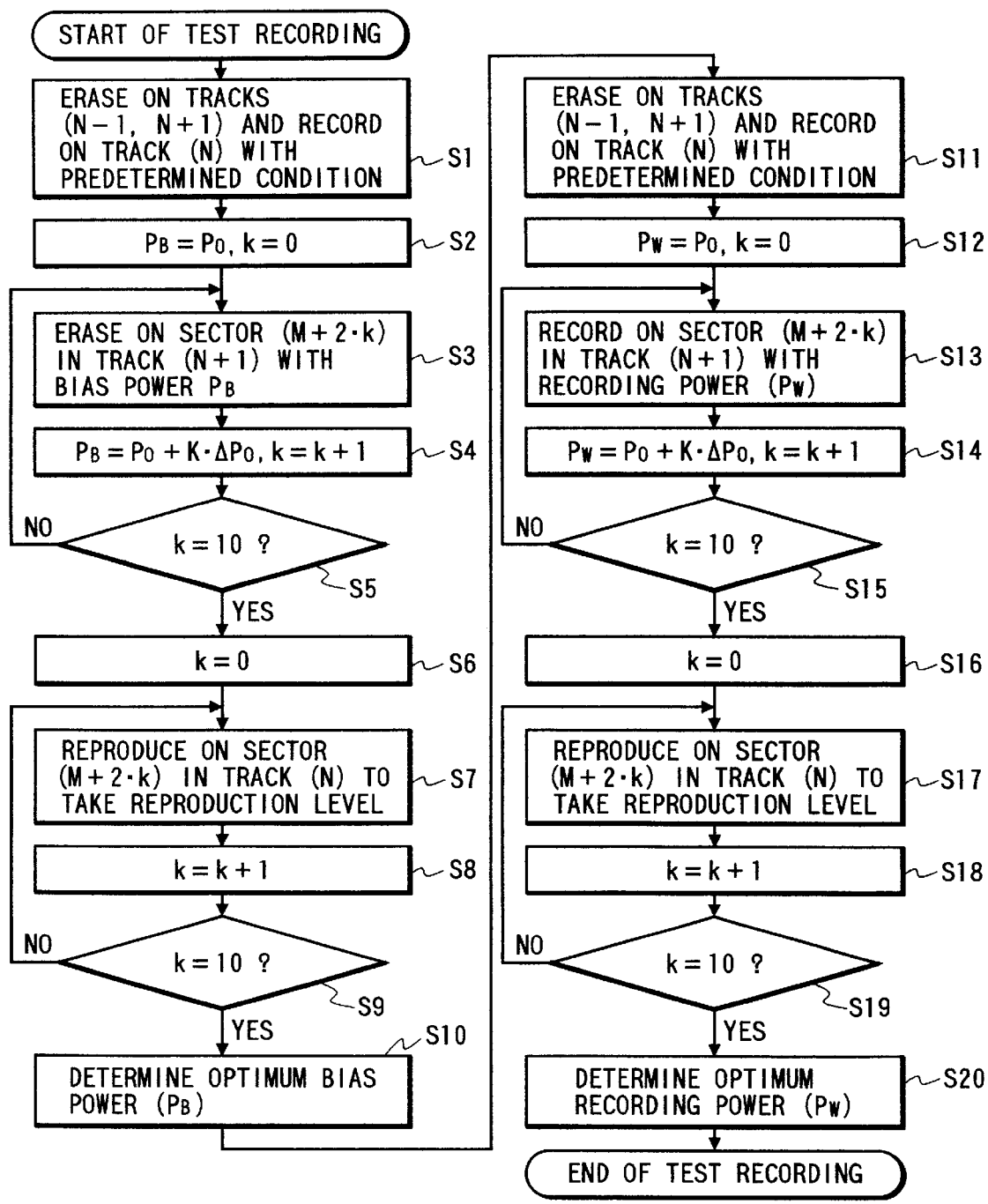
FIG. 12 is a flow chart showing a test recording method according to the fourth embodiment of the present invention.

The fourth embodiment of the present invention will be described next. This embodiment can be suitably applied to a test recording method used when land/groove recording is performed on a phase change type optical disc, especially when mark position recording is performed. FIG. 12 is a flow chart showing the procedure for the test recording method of the embodiment. Assume that the arrangement of an apparatus for recording/reproducing information on a phase change type optical disc in the fourth embodiment is the same as that shown in FIG. 1. Assume, however, that a phase change type optical disc is used as a disc 1, and a controller 10 performs information recording and reproduction on the basis of the recording principle of a phase change disc. Referring to FIG. 12, in test recording, first of all, the controller 10 controls the respective components to erase the data on tracks (N−1, N+1), and records data on track (N) under a predetermined recording condition (step S1). Assume that a continuous pattern with a predetermined mark length is recorded in this recording operation, and the recording power used to record the pattern on track (N) falls within the range of the recording power for normal recording to the recording power that may cause slight cross-write.

When recording on track (N) is complete, the controller 10 controls a laser driver 5 to set the initial value of a bias power $P_B$ to $P_0$, and a value k designating a bias power and a sector from which data is to be erased to 0 (step S2). The controller 10 then erases the data on track (N+1) adjacent to track (N) while predetermined signals are recorded on track (N), as described above. More specifically, the controller 10 erases the data on sector (M+2·k) in track (N+1) with a bias power $P_B$ (step S3). In this case, since k=0, the controller 10 erases the data on sector (M) in track (N+1) with the initial value $P_0$ of the bias power. Subsequently, the controller 10 sets k=k+1 and $P_B=P_0+k·\Delta P_0$ (step S4), and checks whether k=10 (step S5). In this case, since k=1, the flow returns to step S3 to perform the same processing as described above.

Figure 13:
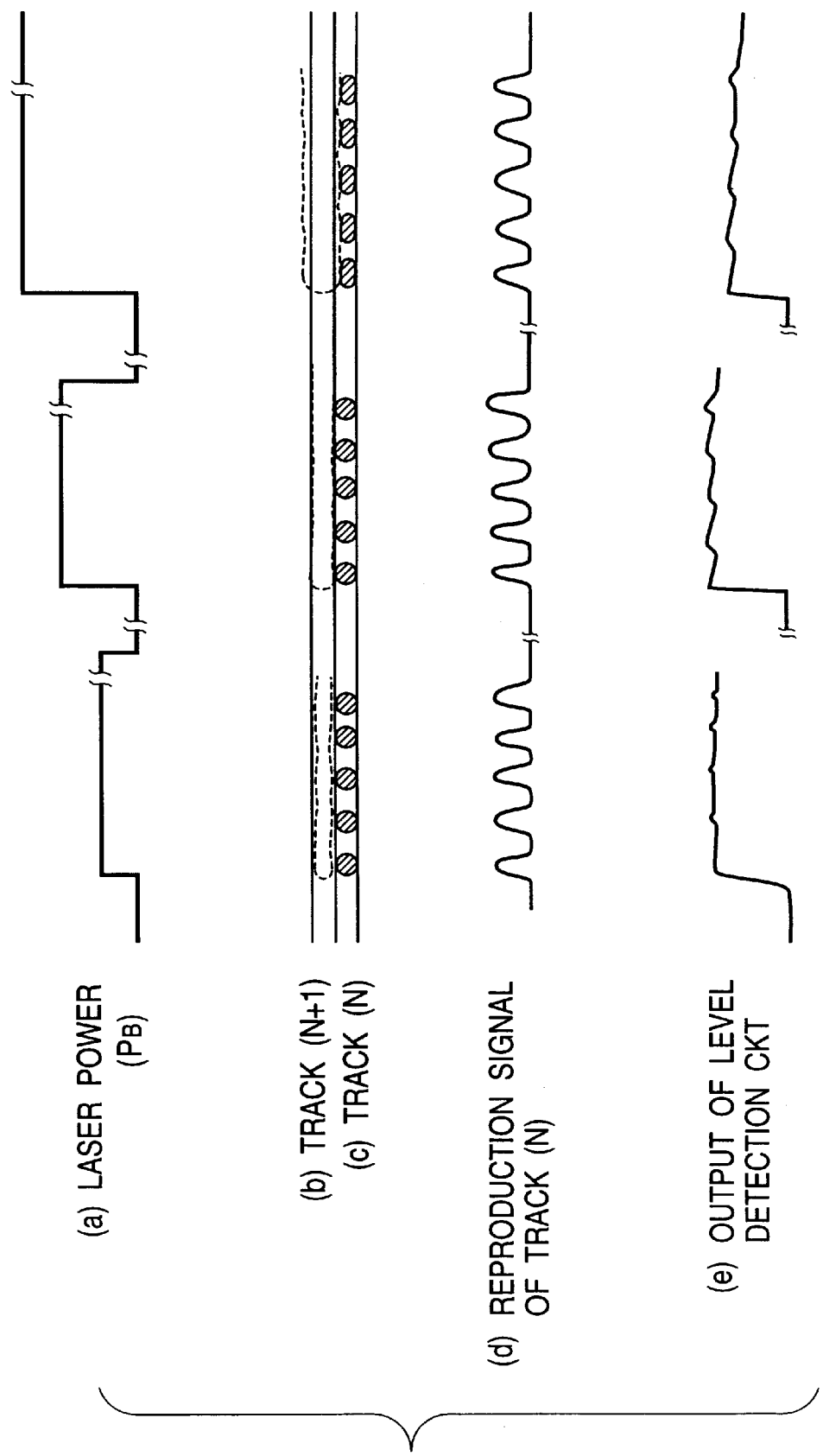
FIG. 13 shows timing charts in (a) through (e) thereof showing signals at the respective components which are obtained when an optimum bias power is obtained in the embodiment in FIG. 12.

More specifically, the controller 10 repeats the processing in steps S3 to S5 to erase the data on sector (M+2), sector (M+4), ..., i.e., every other sector, following sector (M) in track (N+1), while increasing the erasing power by $\Delta P_0$ in units of sectors. FIG. 13(a) shows the bias power $P_B$ in this case. As described above, since the bias power $P_B$ is increased by $\Delta P_0$ in units of sectors, the irradiation range of the erasing beam on track (N+1) extends to the adjacent tracks as the erasing power increases, as shown in FIG. 13(b). For this reason, as shown in FIG. 13(c), the marks recorded on track (N) are partly erased as the erasing power increases, thus causing cross-erase.

If it is determined in step S5 that k=10, and erasing of the data on track (N+1) is complete, the controller 10 sets k=0 (step S6), and reproduces the data on sector (M+2·k) in track (N) to detect the reproduction signal level (step S7). Since K=0 in this case, the controller 10 detects the reproduction level of sector (M) in track (N). The reproduction signal level is detected by a level detection circuit 7. The controller 10 then takes the obtained reproduction level through an A/D converter 8. In this embodiment, the level detection circuit 7 detects the P—P value of the reproduction signal amplitude. The controller 10 stores the reproduction level in a memory in correspondence with the sector number. Thereafter, the controller 10 sets k=k+1 (step S8), and checks whether k=10 (step S9). Since k=1 in this case, the controller 10 performs the same operation as described above from step S7. More specifically, the controller 10 repeats the processing in steps S7 to S9 to reproduce the data on sector (M+2), sector (M+4), ..., i.e., every other sector, following sector (M) in track (N) to detect the reproduction levels in units of sectors.

Figure 14:
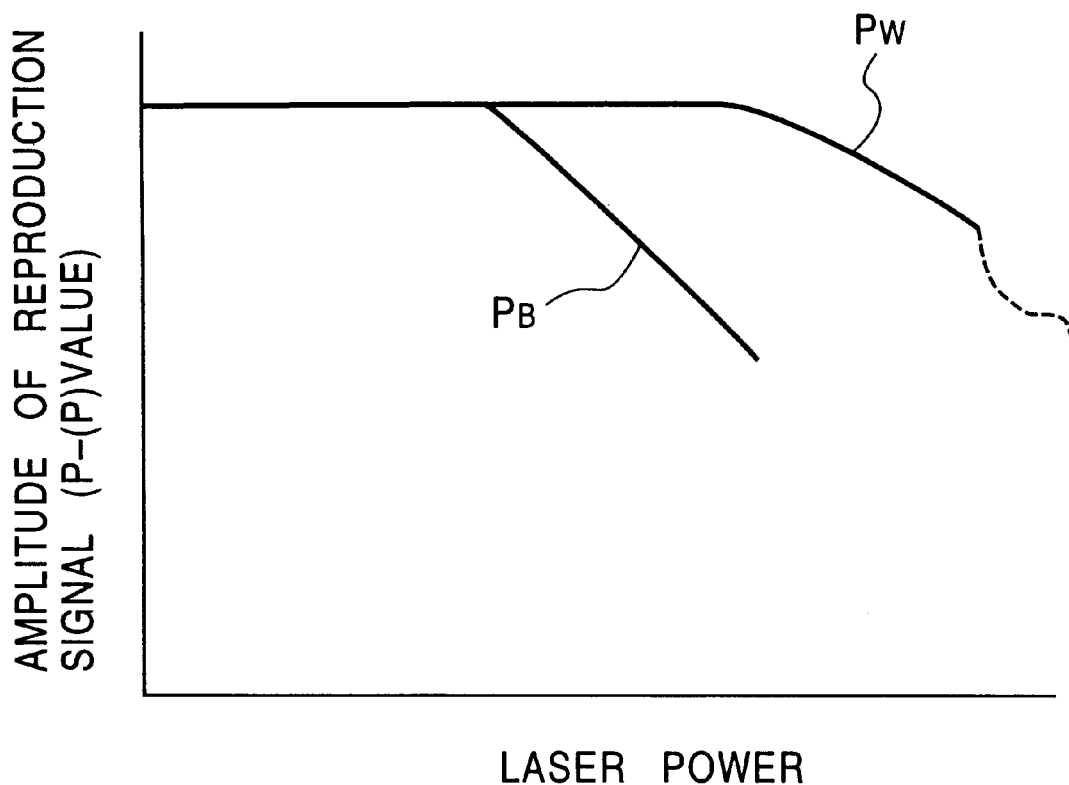
FIG. 14 is a graph showing the relationship between the laser power and the reproduction signal amplitude in a case in which optimum bias and recording powers are obtained by test recording in the embodiment in FIG. 12.

FIG. 13(d) shows the reproduction signal of track (N). FIG. 13(e) shows the levels detected by the level detection circuit 7. In this embodiment, as described above, the level detection circuit 7 detects the amplitudes (P—P values) of reproduction signals. As the erasing power increases, cross-erase occurs, as described above. As is apparent from FIGS. 13(d) and 13C, upon the occurrence of this cross-erase, the amplitude of the reproduction signal decreases. If it is determined in step S9 that k=10, and reproduction of the data on track (N) is complete, the controller 10 determines an optimum bias power $P_B$ on the basis of the erasing power and the reproduction signal amplitudes obtained from the respective sectors in track (N) (step S10). FIG. 14 shows the relationship between the erasing power and the reproduction signal amplitude obtained by the level detection circuit 7. The reproduction signal amplitude is nearly constant while the erasing power is low. However, when the erasing power reaches a predetermined value, the reproduction signal amplitude begins to decrease. That is, when cross-erase occurs, the mark on track (N) is erased, and hence the reproduction signal amplitude begins to decrease upon the occurrence of cross-erase. The controller 10 determines the laser power immediately before the reproduction signal amplitude begins to decrease as shown in FIG. 14 as the optimum bias power $P_B$, and stores it in the memory.

Subsequently, the controller 10 performs processing for determining an optimum recording power $P_W$. Similar to the above description, the controller 10 erases the data on tracks (N−1, N+1), and records data on track (N) under a predetermined recording condition (step S11). The recording condition for track (N) is a successful recording of a predetermined continuous pattern with a recording power falling within the range of the recording power for normal recording to the recording power with which slight cross-write may occur, as in the case with the optimum bias power. The controller 10 sets the initial value of the recording power $P_W$ to $P_0$ and a value k to 0 (step S12), and records a predetermined signal on track (N+1) adjacent to track (N) after recording on track (N), as described above. That is, the controller 10 records the signal on sector (M+2·k) in track (N+1) with the recording power $P_W$ (initial value $P_0$) (step S13). Since k=0 in this case, the signal is recorded on sector (M). Assume that a signal having a mark length sufficiently longer than that of a signal on track (N) is recorded on track (N+1).

In this embodiment, long marks are recorded on track (N+1) by a so-called pulse train method. More specifically, as shown in FIG. 15(a), predetermined marks are recorded by turning on and off the recording power $P_W$ at predetermined intervals. In this case, since test recording is performed on the phase change type optical disc, recording is performed with a laser modulation waveform like the one shown in FIG. 15(a), i.e., a recording waveform obtained by superimposing the recording power $P_W$ on the bias power $P_B$. The bias power $P_B$ is set to the optimum bias power obtained in step S10.

Referring back to FIG. 12, upon recording the mark on sector (M) in track (N+1) in step S13, the controller 10 sets the recording power $P_W=P_0+k·\Delta P_0$ and k=k+1 (step S14), and checks whether k=10 (step S15). Since k=1 in this case, the flow chart returns to step S13 to perform the same processing as described above. More specifically, the controller 10 repeats the processing in steps S13 to S15 to record the predetermined marks on sector (M+2), sector (M+4), ..., i.e., every other sector, following sector (M) in track (N+1) while increasing the recording power by $\Delta P_0$ at a time.

FIG. 15(a) shows the recording waveform in this case. Recording is performed by increasing the recording power $P_W$ by a predetermined amount in units of sectors while keeping the bias power $P_B$ constant. FIG. 15(b) shows the marks recorded on track (N+1) in this manner. FIG. 15(c) shows the marks recorded on track (N) in advance. As shown in FIGS. 15(b) and 15(c), as the recording power $P_W$ increases, the marks on track (N+1) increase in size to cause cross-erase, thus partly erasing the marks on track (N). In addition, when the recording power $P_W$ is further increased, marks are recorded on track (N), causing cross-write.

If it is determined in step S15 that k=10, and recording on track (N+1) is complete, the controller 10 sets k=0 in step S16, and reproduces the data on track (N) in steps S17 to S19. More specifically, the controller 10 repeats the processing in steps S17 to S19 to reproduce the data on sector (M), sector (M+2), sector (M+4), . . . , in track (N), and causes the level detection circuit 7 to detect the reproduction signal amplitudes. The controller 10 takes the detected reproduction signal amplitudes through the A/D converter 8, and stores them in the memory in correspondence with the sector numbers. FIG. 15(d) shows the reproduction signal of track (N), and FIG. 15(e) shows the amplitude of the reproduction signal detected by the level detection circuit 7. As shown in FIG. 15(d), the amplitude of the reproduction signal of track (N) decreases because of cross-erase. When cross-write occurs, the P—P value of the reproduction signal further decreases, including the DC components. Therefore, as shown in FIG. 15(e), the detection level of the reproduction signal amplitude detected by the level detection circuit 7 also decreases in accordance with cross-erase and cross-write. Although the crosstalk amount slightly increases as the recording power $P_W$ increases before it reaches the power with which cross-erase is caused, this increase corresponds to the DC components and hence has no effect on the reproduction signal amplitude.

If it is determined in step S19 that k=10, and detection of the reproduction signal amplitude of track (N) is complete, the controller 10 sets the optimum recording power $P_W$ on the basis of the recording powers for track (N+1) and the reproduction signal amplitudes of track (N) (step S20). FIG. 14 shows the recording power and the reproduction signal amplitude obtained by the above test operation. As shown in FIG. 14, the reproduction signal amplitude begins to decrease at a given recording power. This decrease indicates the occurrence of crosstalk. The controller 10 determines the recording power immediately before the reproduction signal amplitude begins to decrease as an optimum recording power. The obtained optimum recording power is stored in the memory. When the recording power further increases, the reproduction signal amplitude abruptly decreases, as indicated by the dotted line. This decrease indicates the occurrence of crosstalk. The controller 10 controls the laser driver 5 to respectively set the bias power $P_B$ and the recording power $P_W$ indicated by the recording waveform in FIG. 9 to the optimum values obtained by test recording. With the above operation, test recording for land/groove recording on the phase change optical disc is complete.

Note that the reproduction signal amplitudes shown in FIG. 14 are those obtained by reproducing the data on track (N). These amplitudes are obtained by sampling the outputs from the level detection circuit 7 when marks are recorded on adjacent track (track (N+1)). That is, the controller 10 samples the outputs from the level detection circuit 7 at the timings at which the marks are recorded on the adjacent track. In this case, if each mark is set to be very long, the sampling timings are easy to control as in the case with test recording for the bias power $P_B$. In general, in test recording for the bias power $P_B$, since the bias power $P_B$ is a parameter for determining the erasing power, a substantially continuous lighting operation or very long test marks are used to sample the trailing end portion of each portion subjected to test irradiation. The resultant reproduction signal levels are sufficiently stable. Even if, therefore, the sampling timing slightly shifts near the tailing end portion, no problem is posed in terms of precision. That is, the sampling timings can be easily controlled.

Consider the recording power $P_W$. Since the recording power $P_W$ is a parameter for forming marks, short marks can be formed theoretically. Assume that the test mark length is 8 T, and the channel clock (T) is 20 ns. In this case, since at least a sampling time precision of 160 ns is required, it is considerably difficult to realize test recording using such marks. In addition, a high-speed A/D converter is required to take reproduction signals, posing a problem in terms of cost. Therefore, in test recording for the recording power $P_W$ in FIG. 12, if very long test marks (e.g., 100 T) like those described above are used, it suffices to sample only the trailing end portion of each mark, and no problem is posed in terms of precision, as in the case with the bias power $P_B$, thus facilitating control on the sampling timings.

Alternatively, long marks may be alternately recorded on track (N+1) at proper timings, and the outputs from the level detection circuit 7 may be alternately sampled to evaluate the differences between the sampled data. When the optimum recording (erasing) power is to be evaluated with a reproduction signal level, a point at which the decrease in the reproduction signal amplitude which is accounted for by cross-erase becomes a predetermined point, and the power at the point is determined as an optimum value. That is, the value required in this case is not the absolute value of the reproduction signal level but the decrease from the initial value, i.e., the relative value. When, therefore, sampling is performed alternately when a mark is present and not present, and the differences between the sampled data are obtained, the relative value of the reproduction signal level, which is required for evaluation, can be obtained. In this case, it is apparent that as the timing and position at which a reference level, i.e., the level of a portion (initial state) free from cross-erase or the like is taken becomes closer to those at which an evaluation portion is taken, the detection precision decrease, i.e., the difference between the sampled data improves.

In contrast to this, if the position at which a reference level is taken is remote from the position at which an evaluation portion is taken, the difference between the degrees of servo control mixes with the essential difference between the two values depending on variations in the degree of serve control, posing problems in terms of precision. For this reason, test recording portions and non-test recording portions are alternately sampled. Every time sampling is performed alternately, the difference between the two sampled values is taken. With this operation, since the timings at which these two values are taken are close to each other, the influence of the difference between the degrees of servo control and the influence of circuit temperature drifts or low-speed noise can be eliminated. In addition, if erasing and non-erasing intervals are alternately set and the same processing as described above is performed in test recording for the bias power $P_B$ as well, a high-precision operation can be realized. In the fourth embodiment, in particular, as is apparent from the comparison between FIGS. 5 and 14, since the rate of change in reproduction level in the region in which the optimum value of laser power is detected is low, a high precision is difficult to obtain. The above technique for high precision is therefore preferably used.

The above description is associated with the test recording method which can be applied to mark position recording on a phase change type optical disc. A test recording method for mark edge recording on a phase change optical disc will be described next. For mark edge recording, a method of recording by using a recording waveform like the one shown in FIG. 16 has been proposed. In this recording method, the recording power $P_W$ is pulse-lighted for a 1.5 T period first, and then pulse-lighted at 1 T intervals. By changing the number of times the recording power $P_W$ is pulse-lighted at 1 T intervals in accordance with the length of each mark, marks each having a desired length are recorded. A method of reducing jitter in a reproduction signal by adjusting the width of each pulse of a recording waveform in accordance with the length of each mark to be recorded has also been proposed.

In practice, the test recording method for mark edge recording on a phase change optical disc is basically the same as the test recording for mark position recording. That is, the optimum bias power $P_B$ is obtained first in accordance with the flow chart of FIG. 12, and the optimum recording power $P_W$ is then determined. In test recording for the optimum bias power $P_B$, the data on track (N+1) is erased while the laser power is changed, with predetermined signals being recorded on track (N), as described with reference to FIG. 13. The data on track (N) is reproduced to detect the reproduction signal levels, and the optimum bias power $P_B$ is determined on the basis of the laser power and the reproduction signal amplitude as shown in FIG. 14. Therefore, test recording for the optimum bias power is performed in the same manner as test recording for mark position recording.

Figure 17:
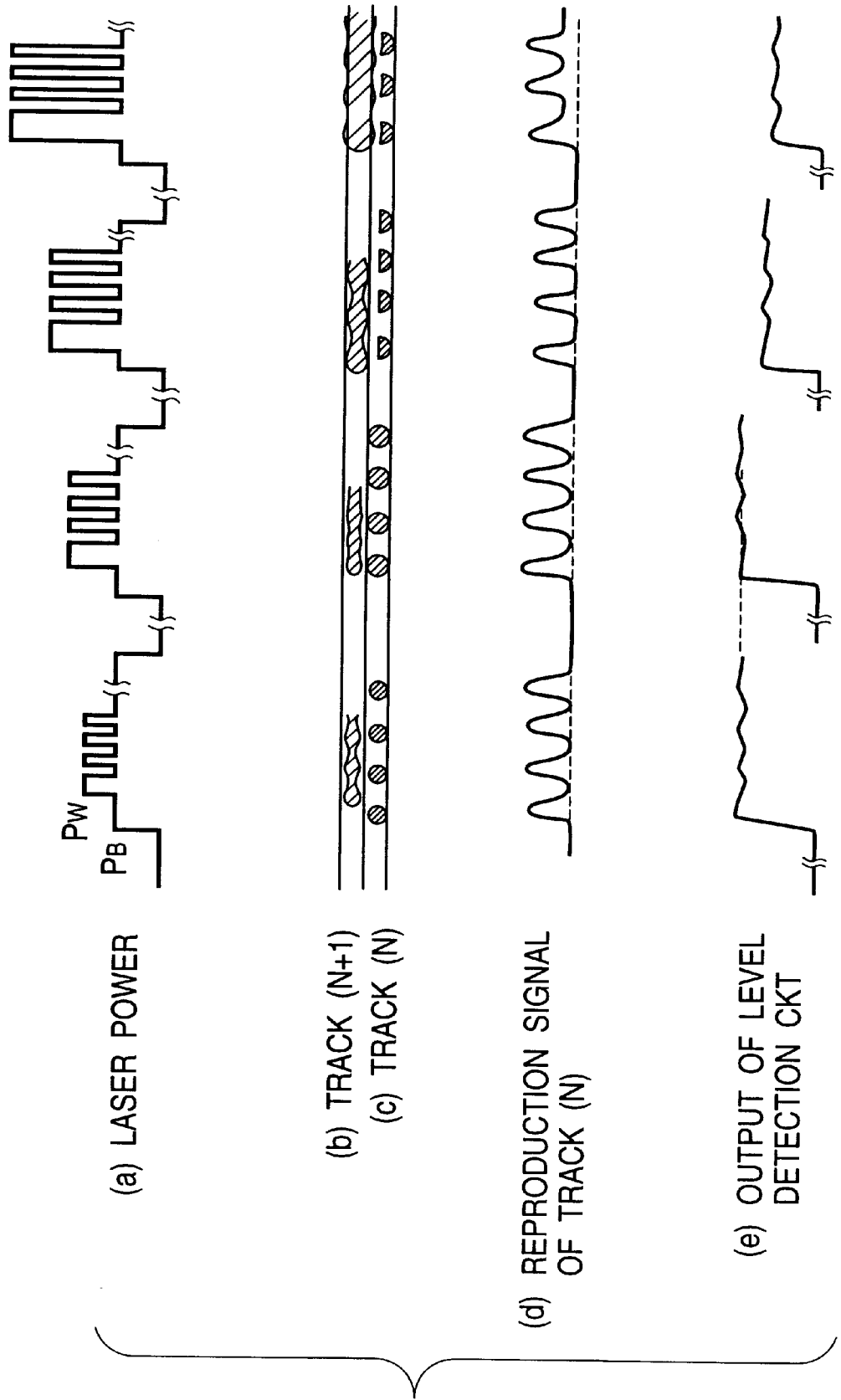
FIG. 17 shows timing charts in (a) through (e) thereof showing signals at the respective components which are obtained to determine an optimum recording power $P_W$ in test recording based on mark edge recording on a phase change optical disc.

In test recording for the optimum recording power $P_W$, marks each having a predetermined length are recorded on track (N+1) while the recording power is changed, with predetermined signals being recorded on track (N), in accordance with the flow chart of FIG. 12. FIGS. 17(a) to 17(e) show the signals at the respective components. When marks are to be recorded on track (N+1), recording is performed by using a recording waveform for mark edge recording like the one shown in FIG. 17(a) to record marks like those shown in FIG. 17(b). This test recording method differs from the test recording method for mark position recording only in this point. That is, in mark position recording, since the power margin is wide as described above, a certain degree of freedom is allowed for a pulse train recording method of forming long marks. In contrast to this, in mark edge recording, a recording waveform equivalent to an actual operation is used. The subsequent steps are the same as those in mark position recording. That is, the data on track (N) is reproduced as shown in FIG. 17(d), and the outputs from the level detection circuit 7 which are shown in FIG. 17(e) are taken, thereby determining the optimum recording power $P_W$ on the basis of the recording powers and the reproduction signal amplitudes.

In mark edge recording, since information is present at the edge position of each mark, the length of each mark in the track direction is preferably adjusted in the following manner after the above test recording is completed. In mark edge recording, marks are recorded by using the recording waveform in FIG. 16. After test recording, the powers $P_B$ and $P_W$ in FIG. 16 are set to the optimum bias power $P_B$ and the optimum recording power $P_W$ obtained in the test recording. Thereafter, for example, 2 T or 3 T marks are recorded first, and the recorded marks are then reproduced. With this operation, the pulse width of the recording waveform in FIG. 16 is adjusted to obtain a 2 T or 3 T mark with an accurate length. This adjustment can prevent unwanted recording (erasing) on adjacent tracks, and ensure high precision of the mark edge position, thereby realizing information recording with a low error rate.

An application of this scheme to a case in which optical modulation mark edge recording is performed on a magneto-optical disc will be described next.

Figure 23:
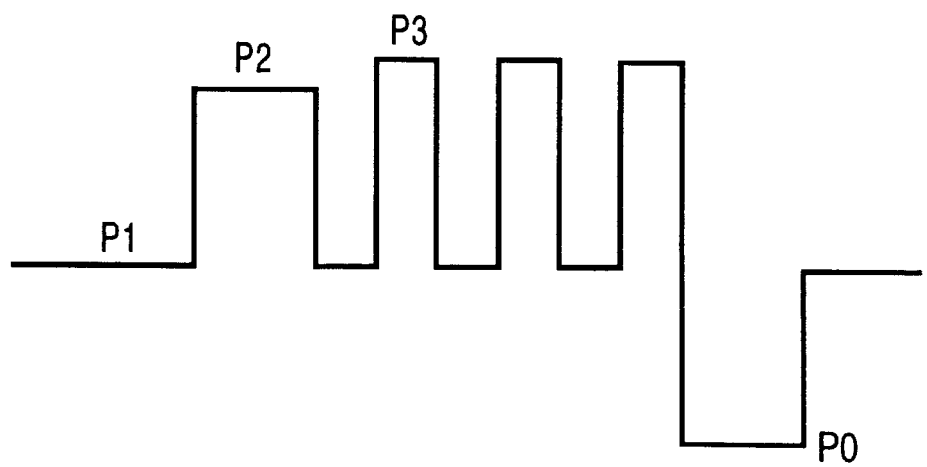
FIG. 23 is a graph showing a laser modulation waveform used for optical modulation edge recording on a magneto-optical disc.

FIG. 23 shows an example of the laser modulation waveform used for a recording operation.

Optical modulation edge recording includes the type of recording that requires erasing before recording, and the direct overwrite type that allows a direct overwrite. However, modulation waveforms which are similar to the one shown in FIG. 23 (except that the guidelines set on P1 to P3 in FIG. 23 differ) are used for both types of recording. The meanings of the power levels P1 to P3 will be briefly described below. In the type of recording that requires erasing before recording, the power P1 is used to perform pre-heating to make the shapes of the leading and trailing ends of a mark substantially symmetrical. More specifically, the temperature profiles at the edge portions of each mark on the medium can be made uniform by setting the power level, different at the start of heating, for the medium to be smaller than that at the end of heating. In the direct overwrite type, the power P1 is used to erase recorded data in cooperation with the function of the initializing magnetic field layer of a medium.

The power P2 and P3 remain the same in both types of recording. The power P2 is required to form marks. The power P3 is finely adjusted with respect to the power P2 to keep each mark, from the leading end to the trailing end, in thermal equilibrium. With this fine adjustment, marks each having a uniform width in the radial direction of the disc can be formed.

In general, the power $P_0$ is set to a value equal to or lower than the read power.

In the type that requires erasing before recording, the method of obtaining an optimum erasing power is the same as the method of obtaining the bias power $P_B$ for a phase change disc, and hence is executed in accordance with the flow chart of FIG. 12. As is apparent, unlike the case of the phase change disc, in this case, an erasing magnetic field must be applied.

An optimum recording power is obtained by changing the powers P1, P2, and P3 while keeping them at a predetermined ratio in the same manner as that for obtaining the recording power $P_W$ for a phase change disc.

An optimum recording power in the direct overwrite type is obtained in the following manner.

First of all, the power P1 is obtained in the same manner as that for obtaining the bias power $P_B$ for a phase change disc. In this case, the laser power exhibits the same profile as that shown in FIG. 13(a). The power P1 obtained in this manner does not cause cross-erase on adjacent tracks and has the maximum value under the corresponding condition. That is, this value is large enough to erase the data on the target track.

Subsequently, the recording power $P_W$ for the phase change disc is obtained in the same manner by changing the powers P2 and P3 while keeping them at a predetermined ratio, with the power P1 obtained in this manner being fixed. FIG. 23 shows the waveform of the laser power in this case; its profile corresponds to the waveform shown in FIG. 17(a).

Referring to FIG. 17(a), $P_B$ corresponds to P1, and $P_W$ corresponds to P2 and P3. In the optical modulation mark edge recording scheme for a magneto-optical disc, since the recording density is high, and it is difficult to form proper mark edges with optical modulation, the allowable range of recording power with which sufficient reproduction signal quality can be obtained is narrow. For this reason, this scheme is preferably used in combination with another test scheme that attaches importance to reproduction signal quality, e.g., a test scheme of obtaining an optimum power such that the optimum S/N ratio is obtained, or jitter in the reproduced signal is minimized.

Figure 18:
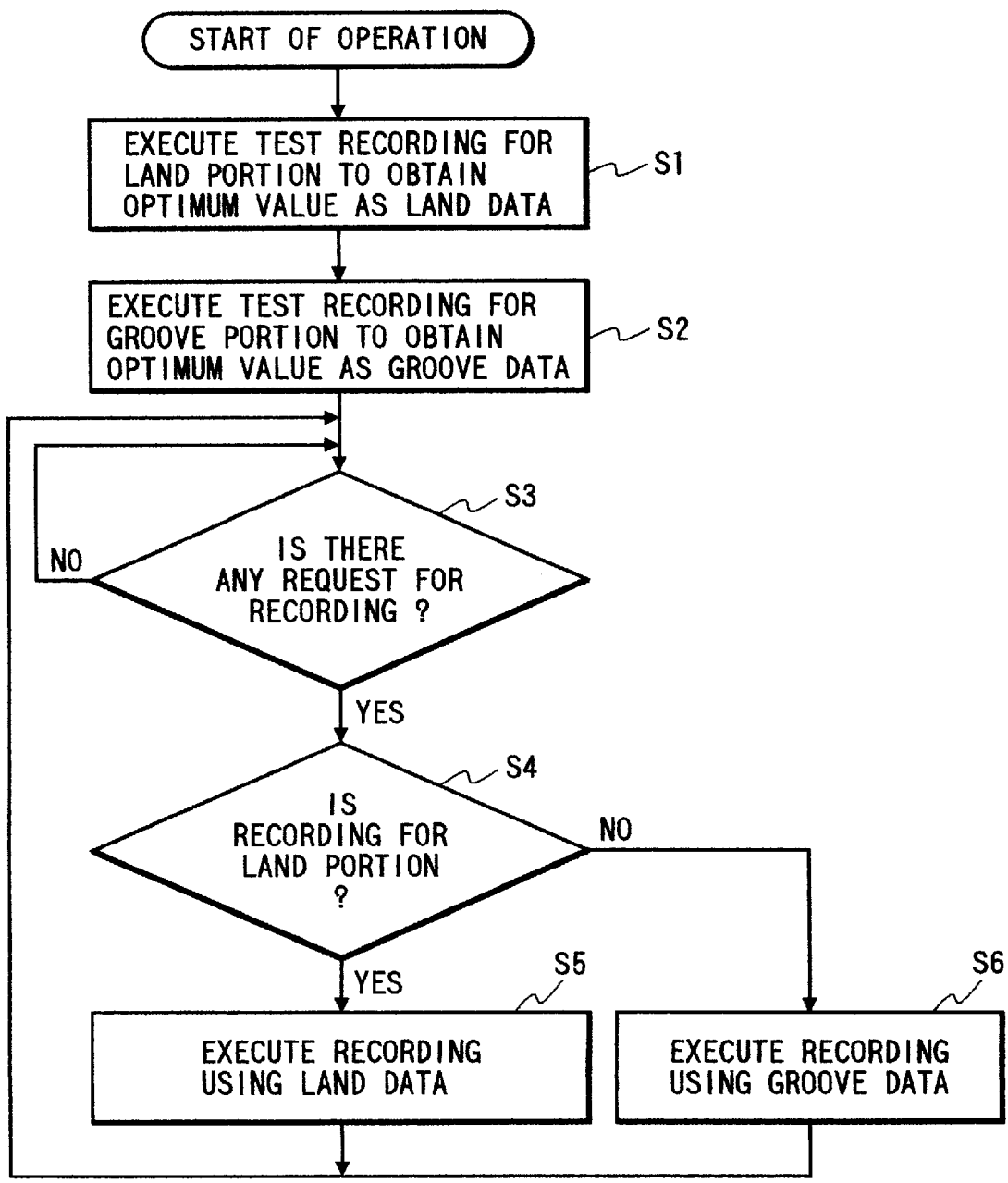
FIG. 18 is a flow chart showing the fifth embodiment of the present invention.

The fifth embodiment of the present invention will be described next. In this embodiment, when test recording is to be performed on a magneto-optical disc or a phase change optical disc, an optimum recording power is obtained by evaluating reproduction signals from both a land and a groove. In the test recording area in FIG. 3, track (N) subjected to evaluation of the reproduction signal is a groove track. In this embodiment, test recording is performed on both track (N) as a groove track and track (N) as a land track. FIG. 18 is a flow chart showing the test recording method of this embodiment.

Referring to FIG. 18, first of all, a controller performs test recording on a land portion (step S1). This operation includes the test recording processes in all the embodiments described above. For example, test recording on a magneto-optical disc is performed in accordance with the flow chart of FIG. 2, 10 or 11, and test recording on a phase change optical disc is performed in accordance with the flow chart of FIG. 12. As is apparent, in this case, test recording is performed on track (N) as a land portion. The resultant data concerning the obtained optimum recording and erasing powers and the like are stored as land data in a memory. When test recording on the land portion is complete, the controller 10 performs test recording on a groove portion, and stores the resultant data in the memory (step S2).

In normal recording, upon reception of a recording request (step S3), the controller 10 checks whether recording is to be performed on a land portion (step S4). If it is determined that recording is to be performed on a land portion, the controller 10 sets the light output of the semiconductor laser by using the land data obtained in step S1, and records data on the land portion (step S5). If it is determined that recording is to be performed on a groove portion, the controller 10 sets the light output of the semiconductor laser by using the groove data obtained in step S2, and records data on the groove portion (step S6). As described above, in this embodiment, test recording is performed on both the land and groove portions, and data are recorded on the land and groove portions by using the corresponding test recording results. Even if, therefore, the land and groove portions on the disc have unbalanced groove shapes, pieces of information can be recorded on the land and the groove with optimum powers, respectively.

The sixth embodiment of the present invention will be described next. This embodiment relates to a method of detecting an optimum power with high precision in determining an optimum power from a test recording result. In the case shown in FIG. 5, in determining an optimum recording power, an inflection point is detected, and the recording power at the point of intersection with a predetermined reproduction level is determined as the optimum recording power. In this method, however, when a large amount of crosstalk occurs, or the gain of the reproducing system changes, a sufficiently high detection precision cannot be obtained. This embodiment is designed to provide an improvement in this respect so as to determine an optimum power with high precision regardless of crosstalk or changes in the gain of the reproducing system.

Figure 19:
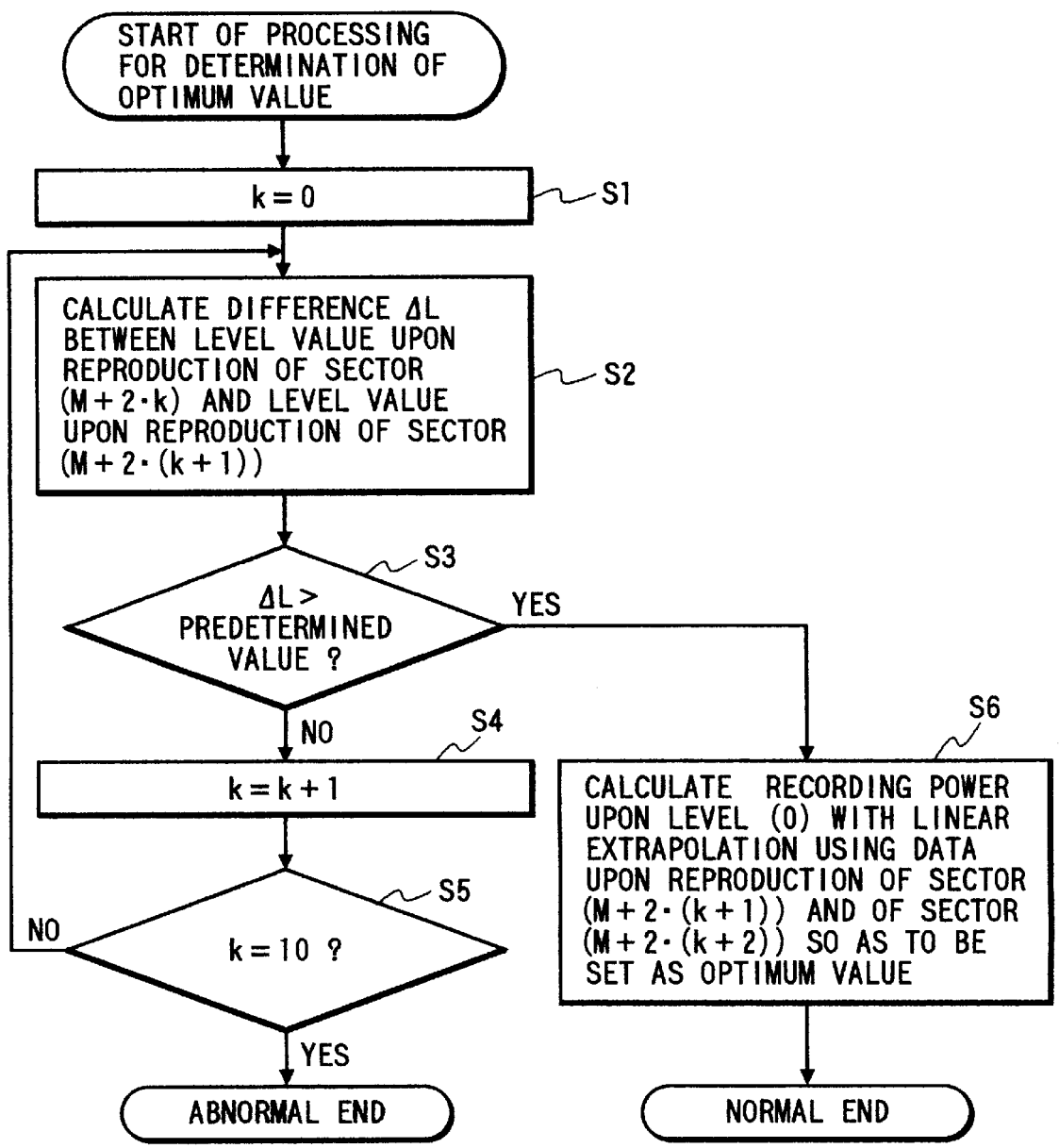
FIG. 19 is a flow chart showing the sixth embodiment of the present invention.

FIG. 19 shows the optimum power determining method of this embodiment in detail. The optimum power determining method in FIG. 19 can be applied to the optimum power determination processes in all the embodiments described above. That is, optimum powers can be detected with high precision by executing the processing in the flow chart of FIG. 19 in the optimum recording power determination processing in step S10 in FIG. 2, the optimum recording power determination processing in step S14 in FIG. 10 or 11, the optimum bias power determination processing in step S10 in FIG. 12, and the optimum recording power in step S20 in FIG. 12. This method will be described in detail with reference to FIGS. 1 and 19. Referring to FIG. 19, a controller 10 sets the value k to 0 (step S1). This value k is the same as that described with reference to FIG. 2.

The controller 10 calculates a difference ΔL between the level value detected by a level detection circuit 7 upon reduction of the data on sector (M+2·k) and the level value detected upon reproduction of the data on sector (M+2(k+1)) (step S2). Consider, for example, the test recording process in the flow chart of FIG. 2. In this case, the controller 10 records data on track (N+1) while increasing the recording power by a predetermined amount in unit of sectors, and reproduces the data on track (N) to detect the reproduction levels. The controller 10 calculates the difference between the level value of sector (M), from which data is reproduced at this time, and the level vale of sector (M+2). Subsequently, the controller 10 compares the obtained difference ΔL with a predetermined value (step S3). If the difference ΔL is smaller than the predetermined value (NO in step S3), the controller 10 sets k=k+1 (step S4), and checks whether k=10 (step S5). Since k=1 in this case, the flow returns to step S2 to perform the same processing as described above. More specifically, the controller 10 repeats the processing in steps S2 to S5 to sequentially calculate the difference between the level value of each sector designated by the value k, which is incremented one by one, and the level value of the next sector.

Figure 20:
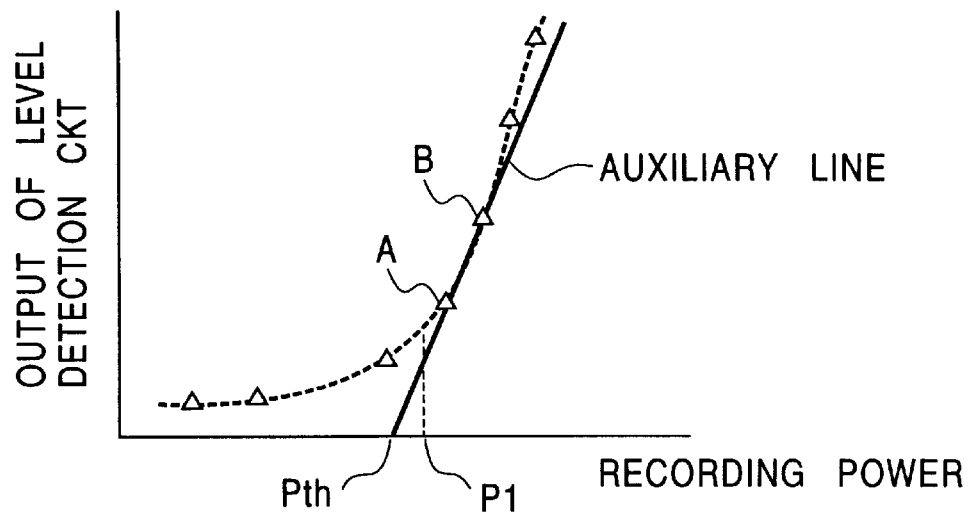
FIG. 20 is a graph for explaining optimum power detection in the embodiment in FIG. 19.

If it is determined in step S3 that the difference ΔL is larger than the predetermined value (YES in step S3), the controller 10 calculates an optimum value by using the data (level value) obtained upon reproduction of sector (M+2·(k+2)) designated by the value k immediately after YES is obtained in step S3, and the level value obtained upon reproduction of the next sector (M+2·(k+2)) (step S6). FIG. 20 shows the relationship between the recording power and the level value detected by the level detection circuit 7. The level value of the reproduction signal gradually increases as the recording power increases. When the recording power exceeds a recording power $P_1$, the slope of the level value curve abruptly steepens. At $P_1$, the difference ΔL exceeds a predetermined value, and optimum power calculation processing is performed in step S6. In step S6, the controller 10 connects level values A and B, obtained immediately after the recording power exceeds $P_1$, through an auxiliary line, as shown in FIG. 20, and performs arithmetic processing to obtain the recording power at the point of intersection of the extended line of the auxiliary line and a straight line representing a level value of 0, thereby determining a recording power $P_{th}$ obtained at the point of intersection. With the above operation, the optimum power determination processing is complete.

Figure 21:
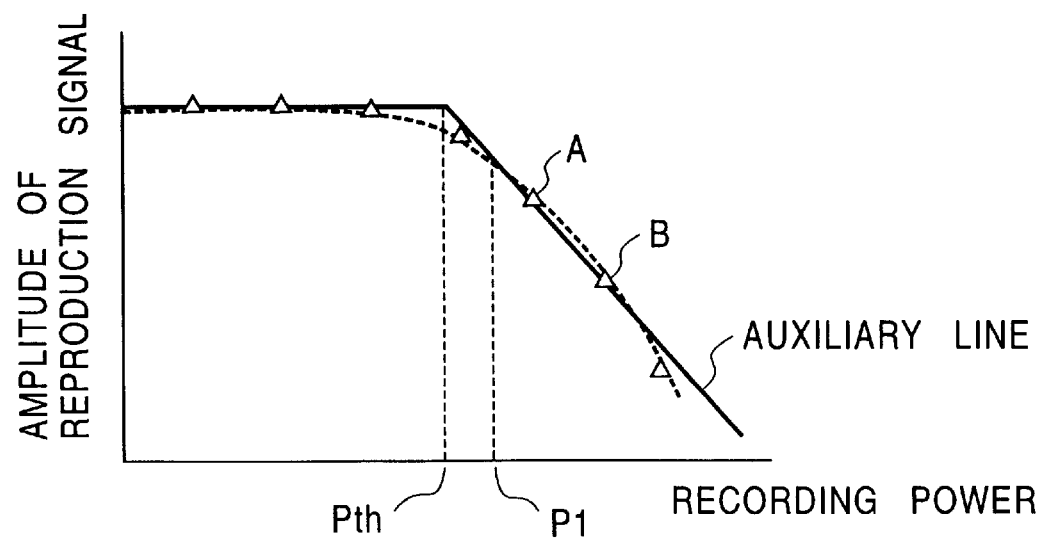
FIG. 21 is a graph for explaining optimum power detection in the embodiment in FIG. 19.

In test recording in FIG. 12, as described with reference to FIG. 14, the reproduction signal amplitude decreases as the recording (erasing) power, either the optimum bias power or the optimum recording power, increases. FIG. 21 shows the relationship between the recording power and the reproduction signal amplitude in this case. In determining an optimum power in this case as well, level values A and B are connected through an auxiliary line immediately after the difference ΔL exceeds the predetermined value at the recording power $P_1$, and the recording power (erasing) power $P_{th}$ at the point of intersection between the extended line of the auxiliary line and the maximum value of the reproduction signal amplitude is obtained, thereby determining an optimum power. In this case, therefore, the optimum power can be obtained by the same method as described above except for the polarity of the slope of each auxiliary line.

In this embodiment, the reproduction level values at two points in a region immediately after the difference ΔL exceeds the predetermined value are connected to each other through a straight line, and the recording power at the point of intersection of the extended line of the straight line and a straight line representing a reproduction signal level value of 0 (or a maximum value) is determined as an optimum power. For this reason, cross-write occurs in a region in which the slope of the reproduction signal level value after the difference ΔL exceeds the predetermined value is large, and evaluation is performed by using a level value sufficiently larger than crosstalk. In determining an optimum power, therefore, the influence of crosstalk can be reduced. In addition, even if the gain of the reproducing system varies, and the reproduction signal level changes, since an optimum power is detected on the basis of the relative value of the reproduction signal level as described above, an optimum power can be detected with high precision without being influenced by the variations in the gain of the reproducing system.

Figure 22:
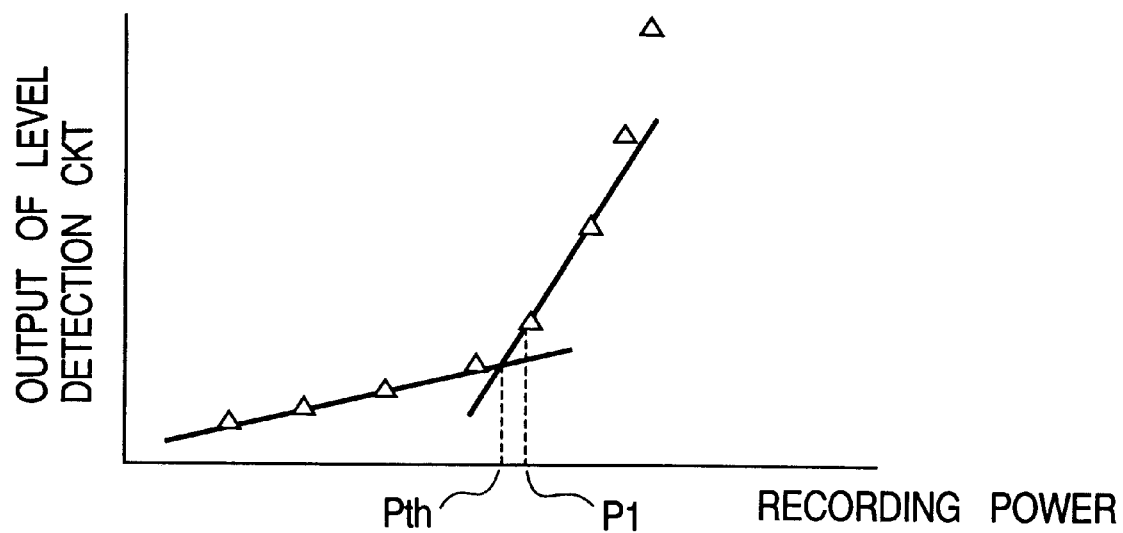
FIG. 22 is a graph for explaining another method of detecting an optimum power.

Note that a method of determining the power at the point of intersection of an auxiliary line and a straight line (FIG. 20 or 21) representing an increase in crosstalk as an optimum power may be used as a method of detecting an optimum power. More specifically, as shown in FIG. 22, after two or more evaluation points with which the difference ΔL is equal to or smaller than the predetermined value and which are close to $P_{th}$ are selected, these points are then approximated to a straight line by the least square method. The recording power $P_{th}$ at the point of intersection of the obtained straight line and the above straight line is determined as an optimum value. With this operation, although the reproduction level moderately changes in an interval before the recording power reaches $P_{th}$ owing to the influence of crosstalk, since such an influence of crosstalk can be eliminated, the influences of crosstalk can be reduced. The inflection point (optimum value) can therefore be detected more accurately.

As has been described above, according to the present invention, signals are recorded on a predetermined track of a recording medium with different recording powers, and the data on an adjacent track are reproduced. An optimum power is then determined on the basis of the relationship between the reproduction signal level and the recording power. With this operation, in land/groove recording, in which pieces of information are recorded on both a land and a groove, no data is recorded/erased on/from adjacent tracks, and information can be recorded with high reliability. In addition, optimum bias and recording powers for a phase change recording medium can be obtained in the same manner as described above. The present invention can therefore provide proper test recording for land/groove recording, and can record information with high reliability. Furthermore, in a direct overwrite and recording based on the optical modulation scheme with respect to a magneto-optical recording medium, optimum powers for both types of recording can be obtained. Moreover, test recording is performed on both a land track and a groove track, and data are recorded on the two types of tracks by using corresponding power values. With this operation, even if the land and groove portions on the recording medium have unbalanced groove shapes, optimum recording can be performed.

What is claimed is:

1. A test recording method of determining an optimum power of the light output from a light source in erasing pieces of information recorded on a land and a groove of a recording medium, comprising the steps of:

recording a predetermined signal on a predetermined track of the medium;

erasing data on a track adjacent to the predetermined track, on which the predetermined signal is recorded, with different erasing powers;

reproducing the predetermined signal recorded on the predetermined track and detecting a reproduction signal; and setting an optimum erasing power on the basis of the reproduction signal and the different erasing powers, wherein the optimum erasing power is set to a power at a point of intersection of a straight line connecting at least reproduction signal amplitude values at two points in a range in which a rate of change in reproduction signal amplitude which changes with an increase in the erasing power is not less than a predetermined value, and a straight line representing a maximum reproduction signal amplitude value.

2. An optical information recording/reproducing apparatus for executing test recording for determining an optimum power of the light output from a light source in erasing pieces of information recorded on a land and a groove of a recording medium, comprising:

means for recording a predetermined signal on a predetermined track of the medium;

means for erasing data on a track adjacent to the predetermined track, on which the predetermined signal is recorded, with different erasing powers;

means for reproducing the predetermined signal recorded on the predetermined track and detecting a reproduction signal; and means for setting an optimum erasing power on the basis of the reproduction signal and the different erasing powers, wherein the optimum erasing power is set to a power at a point of intersection of a straight line connecting at least reproduction signal amplitude values at two points in a range in which a rate of change in reproduction signal amplitude which changes with an increase in the erasing power is not less than a predetermined value, and a straight line representing a maximum reproduction signal amplitude value.

* * * * *

UNITED STATES PATENT AND TRADEMARK OFFICE
CERTIFICATE OF CORRECTION

PATENT NO. : 5,949,747

DATED : September 7, 1999

INVENTOR(S) : AKIRA MIYASHITA, ET AL.

It is certified that error appears in the above-identified patent and that said Letters Patent is hereby corrected as shown below:

COLUMN 5:

Line 26, "disc" should read --disc 1--.
    Line 28, delete "onto the disc 1".

COLUMN 6:

Line 23, delete "the".

COLUMN 12

Line 33, "an disc" should read --a disc--.
    Line 36, "k0" should read --K=0--.

UNITED STATES PATENT AND TRADEMARK OFFICE
CERTIFICATE OF CORRECTION

PATENT NO. : 5,949,747

DATED : September 7, 1999

INVENTOR(S) : AKIRA MIYASHITA, ET AL.

It is certified that error appears in the above-identified patent and that said Letters Patent is hereby corrected as shown below:

COLUMN 16:

Line 45, "decrease," should read --decreases,--.

COLUMN 20:

Line 30, "vale" should read --value--.

Signed and Sealed this

Twenty-fifth Day of July, 2000

Attest:

Q. TODD DICKINSON

Attesting Officer    Director of Patents and Trademarks